US007292358B2

(12) United States Patent
Ikegami et al.

(10) Patent No.: US 7,292,358 B2
(45) Date of Patent: Nov. 6, 2007

(54) IMAGE FORMING APPARATUS

(75) Inventors: Hideyuki Ikegami, Chiba (JP); Takashi Fujimori, Ibaraki (JP); Hidenori Sunada, Ibaraki (JP); Satoru Yamamoto, Ibaraki (JP)

(73) Assignee: Canon Kabushiki Kaisha (JP)

(*) Notice: Subject to any disclaimer, the term of this patent is extended or adjusted under 35 U.S.C. 154(b) by 1009 days.

(21) Appl. No.: 10/676,806

(22) Filed: Oct. 1, 2003

(65) Prior Publication Data

US 2004/0160620 A1 Aug. 19, 2004

(30) Foreign Application Priority Data

Oct. 1, 2002 (JP) ............................ 2002-289138

(51) Int. Cl.
*G06K 15/00* (2006.01)
*H04N 1/36* (2006.01)

(52) U.S. Cl. ........................ 358/1.14; 358/422; 399/70

(58) Field of Classification Search ............... 358/1.14, 358/501, 401, 468, 422; 399/70
See application file for complete search history.

(56) References Cited

U.S. PATENT DOCUMENTS 7,072,053 B2 * 7/2006 Guddanti ................... 358/1.13
7,120,372 B2 * 10/2006 Kim et al. .................... 399/70
2003/0128157 A1 * 7/2003 Salkhi ................... 342/357.06
2005/0158067 A1 * 7/2005 Kim et al. .................... 399/70
2005/0283304 A1 * 12/2005 Endo .......................... 701/114

* cited by examiner

*Primary Examiner*—Jerome Grant, II
(74) *Attorney, Agent, or Firm*—Rossi, Kimms & McDowell LLP

(57) ABSTRACT

There is provided an image forming apparatus which is capable of operating in a stable condition and in an efficient manner by omitting automatic adjustment in the case where there is no necessity of carrying out the automatic adjustment when the image forming apparatus returns from a power-saving mode to a normal mode. A CPU shifts the operation mode of the image forming apparatus to a power-saving mode in which power consumption is saved. The CPU detects at least one of a status of the image forming apparatus before the operation mode is shifted to the power-saving mode and a status of the image forming apparatus in the power-saving mode. The CPU determines the contents of a return process executed when the operation mode returns to a normal mode from the power-saving mode, according to the detected status of the image forming apparatus.

9 Claims, 15 Drawing Sheets

IMAGE FORMING APPARATUS

BACKGROUND OF THE INVENTION

1. Field of the Invention

The present invention relates to an image forming apparatus such as a copying machine or a printer, which has a power-saving mode in which power consumption is saved, and more particularly to an image forming apparatus that is capable of reducing the period of time required for returning from the power-saving mode to start printing.

2. Description of the Related Art

Conventionally, image forming apparatuses such as copying machines and printers have been proposed which have a power-saving mode in which power consumption is saved. The image forming apparatuses enter the power-saving mode when a user selects the power-saving mode or when a timer indicates that a predetermined period of time has elapsed. The power-saving mode is intended to save power consumption by providing power-saving control for loads of the image forming apparatuses; e.g. a fixing device is set to a lower temperature than normal.

However, in the power-saving mode, the conventional image forming apparatuses carry out the same process (according to a fixed procedure) when returning from the power-saving mode to a normal mode. This return process includes automatic adjustment, which is intended to obtain a proper print image and takes a relatively long period of time. Since the return process is carried out according to the fixed procedure as described above, the automatic adjustment is carried out even in the case where no problem arises if the automatic adjustment is not carried out when the image forming apparatus returns from the power-saving mode to the normal mode. This is inefficient because it takes a long time to return from the power-saving mode and start printing.

SUMMARY OF THE INVENTION

It is an object of the present invention to provide an image forming apparatus that is capable of operating in a stable condition and in an efficient manner by omitting the automatic adjustment in the case where it is unnecessary to carry out the automatic adjustment when the image forming apparatus returns from the power-saving mode to the normal mode.

To attain the above object, there is provided an image forming apparatus comprising an image forming device that forms an image on a recording material, a power-saving mode shifting device that shifts an operation mode of the image forming apparatus to a power-saving mode in which power consumption is saved, a status detecting device that detects at least one of a status of the image forming apparatus before the operation mode is shifted to the power-saving mode by the power-saving mode shifting device and a status of the image forming apparatus in the power-saving mode, and a return process determining device that determines contents of a return process executed when the operation mode returns to a normal mode from the power-saving mode, according to a result of detection by the status detecting device.

Preferably, the status detecting device detects a period of time for which the image forming device has not been used before the operation mode is shifted to the power-saving mode, and the return process determining process determines the contents of the return process according to the period of time for which the image forming device has not been used before the operation mode is shifted to the power-saving mode.

More preferably, the return process comprises at least adjustment relating to the image forming device, and the return process determining device omits execution of the adjustment relating to the image forming device as the return process when the period of time for which the image forming device has not been used before the operation mode is shifted to the power-saving mode is not greater than a predetermined period of time, and executes the adjustment relating to the image forming device as the return process when the period of time for which the image forming device has not been used before the operation mode is shifted to the power-saving mode is greater than the predetermined period of time.

Also preferably, the status detecting device detects a sum of a period of time for which the image forming device has not been used before the operation mode is shifted to the power-saving mode and a period of time for which the image forming apparatus has been in the power-saving mode, and the return process determining device determines the contents of the return process according to the detected sum of the period of time for which the image forming device has not been used before the operation mode is shifted to the power-saving mode and the period of time for which the image forming apparatus has been in the power-saving mode.

More preferably, the return process comprises at least adjustment relating to the image forming device, and the return process determining device omits execution of the adjustment relating to the image forming device as the return process when the sum of the period of time for which the image forming device has not been used before the operation mode is shifted to the power-saving mode and the period of time for which the image forming apparatus has been in the power-saving mode is not greater than a predetermined period of time, and executes the adjustment relating to the image forming device as the return process when the sum of the period of time for which the image forming device has not been used before the operation mode is shifted to the power-saving mode and the period of time for which the image forming apparatus has been in the power-saving mode is greater than the predetermined period of time.

Also preferably, the status detecting device detects whether a door of the image forming apparatus is opened or closed while the image forming apparatus is in the power-saving mode, and the return process determining device determines the contents of the return process according to a result of the detection as to whether the door is opened or closed.

More preferably, the return process comprises at least adjustment relating to the image forming device, and the return process determining device executes the adjustment relating to the image forming device as the return process when the door is opened while the image forming apparatus is in the power-saving mode.

Also preferably, the status detecting device detects a period of time for which the image forming apparatus has been in the power-saving mode, and the return process determining device determines the contents of the return process according to the detected period of time for which the image forming apparatus is in the power-saving mode.

More preferably, the return process comprises at least adjustment relating to the image forming device, and the return process determining device executes the adjustment relating to the image forming device as the return process when the period of time for which the image forming apparatus has been in the power-saving mode is greater than a predetermined period of time.

With the above arrangement according to the present invention, when the image forming apparatus returns from the power-saving mode to the normal mode, the image forming apparatus executes the automatic adjustment when it is necessary to executes the automatic adjustment, and omits the automatic adjustment when it is unnecessary to executes the automatic adjustment. As a result, the image forming apparatus can operate in a stable condition and in an efficient manner.

The above and other objects, features, and advantages of the invention will become more apparent from the following detailed description taken in conjunction with the accompanying drawings.

BRIEF DESCRIPTION OF THE DRAWINGS

FIGS. 2A and 2B are views showing a state in which a door of the image forming apparatus in FIG. 1 is opened/closed, in which FIG. 2A shows a state in which the door is closed, and FIG. 2B shows a state in which the door is opened;

DETAILED DESCRIPTION OF THE PREFERRED EMBODIMENTS

The present invention will now be described in detail with reference to the drawings showing preferred embodiments thereof.

Figure 1:
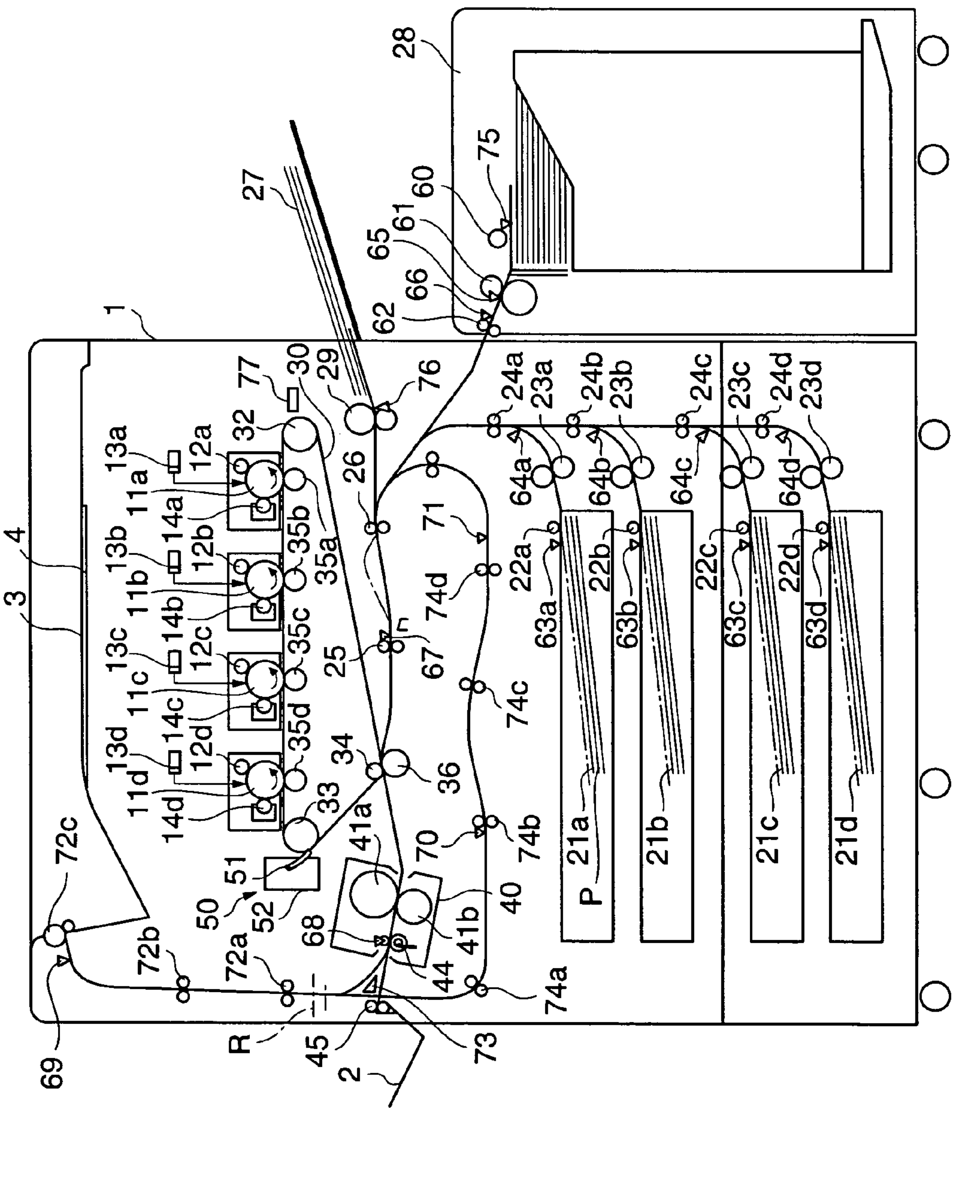
FIG. 1 is a view showing the internal construction of an image forming apparatus according to a first embodiment of the present invention.

First, a description will be given of the entire construction of an image forming apparatus according to a first embodiment of the present invention. FIG. 1 is a view showing the internal construction of the image forming apparatus. The image forming apparatus is constructed such that a deck 28 as a recording material storing section is annexed to an image forming apparatus main body 1. The image forming apparatus is capable of operating in either a normal mode in which power is supplied to a load in a normal way or a power-saving mode in which power consumption is saved.

The image forming apparatus is comprised mainly of an image forming section (four stations a, b, c, and d corresponding to respective four colors of yellow, cyan, magenta, and black, which are juxtaposed and are identical in construction with each other), a sheet feed section for supplying a recording material, an intermediate transfer section for transferring a toner image onto the recording material, a conveying section for conveying the recording material, a fixing unit for fixing the toner image transferred onto the recording material, an operating section for making various settings and displaying various information items, and a control unit (not shown) for controlling various sections of the image forming apparatus. In the present embodiment, it is assumed that a digital copying machine, which carries out image formation based on the electrophotographic process, is used as the image forming apparatus.

Next, a detailed description will be given of the above component parts of the image forming apparatus.

First, a description will be given of the image forming section. The image forming section is constructed such that each of photosensitive drums 11*a*, 11*b*, 11*c*, and 11*d* as image carriers for respective four colors is rotatably supported by a central shaft thereof and is rotatively driven by a driving motor, not shown, in a direction indicated by an arrow in FIG. 1. At locations opposed to respective outer peripheral surfaces of the photosensitive drums 11*a* to 11*d*, roller dischargers 12*a*, 12*b*, 12*c*, and 12*d*, scanners 13*a*, 13*b*, 13*c*, and 13*d*, and developing devices 14*a*, 14*b*, 14*c*, and 14*d* are arranged in a direction in which the photosensitive drums 11*a* to 11*d* are rotated.

In an image forming process, first, the roller chargers 12*a* to 12*d* apply a uniform amount of electric charge to the surfaces of the photosensitive drums 11*a* to 11*d*. Then, the scanners 13*a* to 13*d* cause the respective photosensitive drums 11*a* to 11*d* to be exposed to a ray of light such as a laser beam, which has been modulated according to a recording image signal, so that electrostatic latent images are formed on the respective photosensitive drums 11*a* to 11*d*. Further, the developing devices 14*a* to 14*d* storing respective toners (developing agents) of four colors (yellow, cyan, magenta, and black) visualize the electrostatic latent images to form visible images. The visualized images are transferred onto an intermediate transfer belt 30. By the above described processing, images are successively formed using respective toners of four colors.

The sheet feed section includes component parts for storing recording materials P (sheet feed cassettes 21*a*, 21*b*, 21*c*, and 21*d*, a manual feed tray 27, and the deck 28), rollers for conveying the recording materials P, sensors for detecting the passage of the recording materials P, sensors for detecting the presence of the recording materials P, and guides, not shown, for conveying the recording materials P on a conveying path. A plurality of recording materials P are stored in the sheet feed cassettes 21*a*, 21*b*, 21*c*, and 21*d*; recording materials P to be manually fed are stored (placed) in the manual feed tray 27; and a large number of recording materials P are stored in the deck 28.

The conveying section includes pick-up rollers 22a, 22b, 22c, and 22d for feeding the recording materials P one by one from the respective sheet feed cassettes 21a, 21b, 21c, and 21d. The pick-up rollers 22a to 22d may each feed a plurality of recording materials P simultaneously, but the plurality of recording materials P are divided one by one by pairs of sheet feed rollers (BC rollers) 23a, 23b, 23c, and 23d. Each of the recording materials P thus divided is conveyed to a pair of registration rollers 25 by the corresponding pair of drawing rollers 24a to 24d and a pair of pre-registration rollers 26.

The recording materials P stored (placed) in the manual feed tray 27 are divided one by one by a pair of sheet feed rollers 29, and each of the recording materials P thus divided is conveyed to the pair of registration rollers 25 by the pair of pre-registration rollers 26. A plurality of the recording materials P stored in the deck 28 are conveyed together to a pair of sheet feed rollers 61 by a pick-up roller 60, and are divided one by one by the pair of sheet feed rollers 61. Each of the recording materials P thus divided is conveyed to a pair of drawing rollers 62, and is then conveyed to the pair of registration rollers 25 by the pair of pre-registration rollers 26.

The intermediate transfer section includes the intermediate transfer belt 30, onto which a toner image is to be transferred and which is made of PET (polyethylene terephthalate) or PVDF (polyvinylidene fluoride), for example. A driving roller 32 transmits a circulating driving force to the intermediate transfer belt 30. A tension roller 33 applies a proper tension to the intermediate transfer belt 30 by the force of a spring, not shown. A driven roller 34 forms a secondary transfer region by sandwiching the intermediate transfer belt 30 between itself and a secondary transfer roller 36, described later. The intermediate transfer belt 30 is supported by the driving roller 32, the tension roller 33, and the driven roller 34, and is driven for rotation. The driving roller 32 is formed of a metal roller having a surface thereof coated with rubber (urethane rubber or chloroprene rubber) with a thickness of several millimeters so as to prevent the driving roller 32 from slipping on the intermediate transfer belt 30. The driving roller 32 is rotatively driven by a stepping motor, not shown.

At locations where the photosensitive drums 11a to 11d are opposed to the intermediate transfer belt 30, primary transfer rollers 35a to 35d to which are applied high voltages for transferring toner images onto the intermediate transfer belt 30 are arranged on the reverse side of the intermediate transfer belt 30. The secondary transfer roller 36 is opposed to the driven roller 34, and forms the secondary transfer region for transferring a toner image onto the recording material P by a nip between the secondary transfer roller 36 and the intermediate transfer belt 30. The secondary transfer roller 36 is pressurized against the intermediate transfer belt 30 with an appropriate force. A cleaning device 50 for cleaning an image forming surface of the intermediate transfer belt 30 is disposed downstream of the secondary transfer region on the intermediate transfer belt 30, and is comprised of a cleaning blade 51 (made of polyurethane rubber, for example) and a waste toner box 52 for storing waster toner.

Further, a patch sensor 77 for detecting the image density of a patch-like reference image formed on the intermediate transfer belt 30 is disposed in the vicinity of the intermediate transfer belt 30 and e.g. at a location opposed to the driving roller 32. The patch sensor 77 is comprised of a photodiode, which detects, for example, light reflected from the intermediate transfer belt 30, and outputs smaller values for higher image densities and outputs greater values for lower image densities. A description will be given later of how the patch sensor 77 detects the density of the patch-like reference image.

The fixing unit 40 is comprised of a fixing roller 41a having a heat source such as a halogen heater incorporated therein, a pressurizing roller 41b which is pressurized against the fixing roller 41a (the pressurizing roller 41b may also have a heat source incorporated therein), and an internal sheet discharging roller 44 which conveys the recording material P conveyed from the nip between the roller pair 41a, 41b. The fixing unit 40 causes the fixing roller 41a and the pressurizing roller 41b to fix images transferred onto the recording material P in the secondary transfer region formed by the intermediate transfer belt 30 and the secondary transfer roller 36. A detailed description will be given later of how images are transferred in the secondary transfer region and how images are fixed by the fixing unit 40.

On the other hand, the recording material P conveyed to the pair of registration rollers 25 is temporarily stopped from being conveyed by causing a roller drive stop mechanism, not shown, to stop rotating the rollers upstream of the pair of registration rollers 25, and is restarted to be conveyed by starting rotating the upstream rollers including the pair of registration rollers 25 in accordance with image formation timing of the image forming section. Accordingly, the recording material P is fed to the secondary transfer region, described later. In the secondary transfer region, the images on the intermediate transfer belt 30 are transferred onto the recording material P, then the transferred images are fixed by the fixing unit 40, and then the recording material P passes through the internal sheet discharging roller 44. Thereafter, the destination of the recording material P is selectively switched by a switching flapper 73.

If the switching flapper 73 is in a face-up sheet discharging position, the recording material P is discharged to a face-up sheet discharge tray 2 by a pair of external sheet discharging rollers 45. On the other hand, if the switching flapper 73 is in a face-down sheet discharging position, the recording materials P are successively conveyed by pairs of inversion rollers 72a, 72b, and 72c and then discharged to a face-down sheet discharge tray 3.

In the case where images are formed on both sides of the recording material P, the recording material P is conveyed toward the face-down sheet discharge tray 3, and when the trailing end of the recording material P reaches an inverting location R, the conveyance of the recording material P is stopped, and the rotational direction of the pairs of inversion rollers 72a to 72c is reversed to convey the recording material P toward pairs of double-sided rollers 74a to 74d. Then, the recording material P is conveyed to the image forming section as in the case where the recording material P is conveyed from any of the cassettes 21a to 21d.

It should be noted that a plurality of sensors are arranged on the conveying path for the recording material P, for detecting the passage of the recording material P, such as sheet feed retry sensors 64a to 64d, a deck sheet feed sensor 65, a deck drawing sensor 66, a registration sensor 67, an internal discharged sheet sensor 68, a face-down discharged sheet sensor 69, a double-sided pre-registration sensor 70, and a double-sided sheet refeed sensor 71. Further, cassette sheet detecting sensors 63a to 63d for detecting the presence of the recording material P on the respective cassettes 21a to 21d are arranged in the respective cassettes 21a to 21d that store the recording materials P, and a manual feed tray sheet detecting sensor 76 for detecting the presence of the recording material P on the manual feed tray 27 is disposed in the manual feed tray 27, and a deck sheet detecting sensor 75 for detecting the presence of the recording material P in the deck 28 is disposed in the deck 28.

The control unit includes a control board, not shown, for controlling the operation of mechanisms in the above described sections or units (the image forming section, the sheet feed section, the intermediate transfer section, the conveying section, and the fixing unit), a motor drive board, not shown, and so forth.

The operating section 4 is disposed on an upper surface of the image forming apparatus main body 1, and enables selection of any sheet feed section in which the recording material P is stored (the sheet feed cassettes 21*a* to 21*d*, the manual feed tray 27, or the deck 28), selection of any sheet discharge tray (the face-up sheet discharge tray 2 or the face-down sheet discharge tray 3), designation of a tab sheet bundle, and so forth. The operating section 4 will be described later in further detail.

A description will now be given of an image forming process carried out by the image forming apparatus. Here, for example, it is assumed that an image is formed on the recording material P conveyed from the sheet feed cassette 21*a*. Upon the lapse of a predetermined period of time after issuance of an image formation start signal, first, the recording materials P are fed one by one from the sheet feed cassette 21*a* by the pick-up roller 22*a*. Each of the recording materials P is conveyed to the pair of registration rollers 25 via the pair of drawing rollers 24*a* and the pair of the pre-registration rollers 26. The pair of registration rollers 25 are at a standstill on this occasion, and the leading end of the recording material P abuts on a nip of the pair of registration rollers 25.

Thereafter, the pair of registration rollers 25 start rotating in accordance with timing in which image formation is started by the image forming section comprised of the photosensitive drums 11*a* to 11*d*, roller chargers 12*a* to 12*d*, scanners 13*a* to 13*d*, developing devices 14*a* to 14*d*, and so forth. The timing in which the pair of registration rollers 25 start rotating is determined such that the recording material P and toner images primarily transferred onto the intermediate transfer belt 30 by the image forming section are aligned with each other in the secondary transfer region.

On the other hand, in the image forming section, in response to issuance of the image formation start signal, a toner image formed by the above described processing on the photosensitive drum 11*d* located at an upstream end in the rotational direction of the intermediate transfer belt 30 is primarily transferred onto the intermediate transfer belt 30 in a primary transfer region by the primary transfer roller 35*d* with a high voltage applied thereto. The toner image primarily transferred onto the intermediate transfer belt 30 is conveyed to the next primary transfer region as the intermediate transfer belt 30 is rotatively driven. In the next primary transfer region, image formation is carried out in timing delayed by a period of time in which the toner image is conveyed from the photosensitive drum 11*d* to the next photosensitive drum 11*c*, so that the next toner image is transferred onto the intermediate transfer belt 30 such that the leading end of the next toner image is aligned with the leading end of the previous image. Thereafter, the same processing is repeated, and finally, four-color toner images are primarily transferred onto the intermediate transfer belt 30.

Then, when the recording material P enters the secondary transfer region and comes into contact with the intermediate transfer belt 30, a high voltage is applied to the secondary transfer roller 36 in timing with passage of the recording material P through the secondary transfer roller 36. The four-color toner images formed on the intermediate transfer belt 30 by the above described processing are then transferred onto the surface of the recording material P. The recording material P is then guided to a nip between the fixing roller 41*a* and the pressurizing roller 41*b* of the fixing unit 40. The toner images are fixed on the surface of the recording material P by heat generated by the fixing roller 41*a* and the pressurizing roller 41*b* and pressure generated by the nip. Then, the recording material P is selectively discharged to the face-up sheet discharge tray 2 or to the face-down sheet discharge tray 3 according to whether the switching flapper 73 is in the face-up sheet discharging position or in the face-down sheet discharging position.

Further, in the present embodiment, the image forming apparatus main body 1 of the image forming apparatus may be equipped with a reader for reading an image on an original in accordance with selection by the user. If the image forming apparatus main body 1 is equipped with the reader, the image forming apparatus is capable of functioning as a copying machine.

Figure 2A:
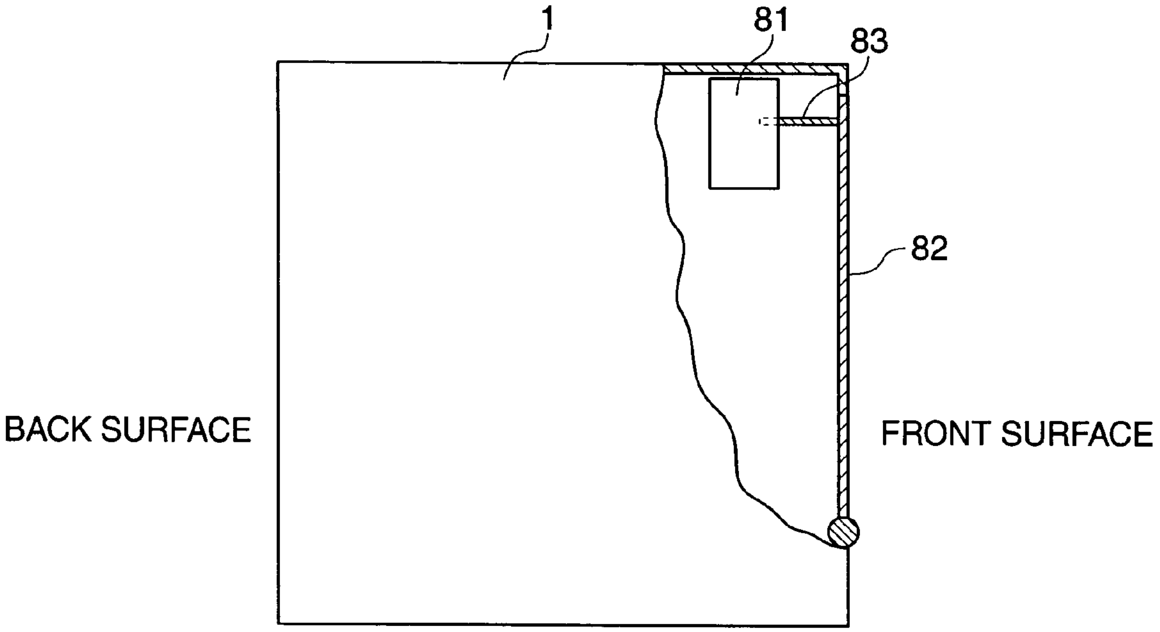
Figure 2B:
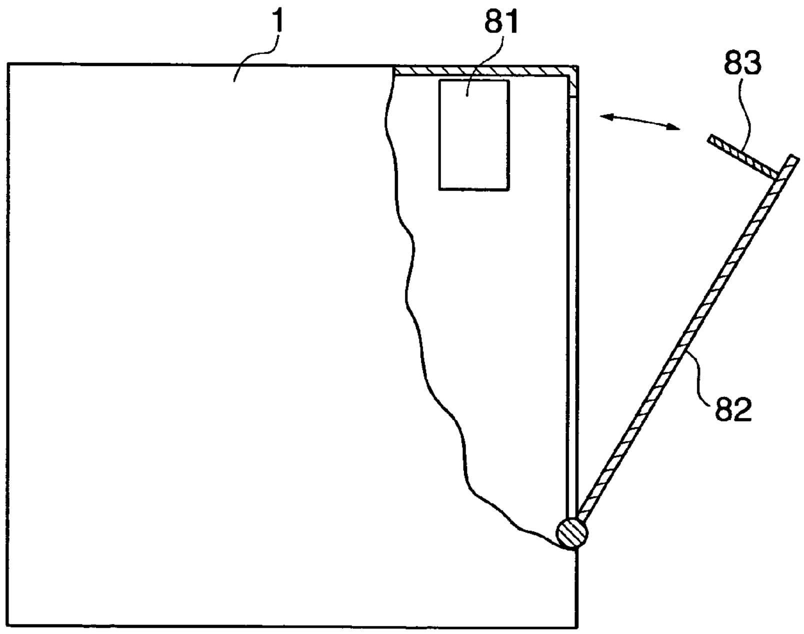

Next, a brief description will be given of the construction of a door of the image forming apparatus with reference to FIGS. 2A and 2B. As shown in FIG. 2A and 2B, a door 82 is disposed on a front surface of the image forming apparatus main body 1. The door 82 is adapted to be opened when it is necessary to perform some operation in the image forming apparatus main body 1 e.g. when the recording material P is jammed or when a cartridge is replaced with a new one. A protrusion 83, which is shaped to engage with a sensor 81 disposed in the image forming apparatus main body 1, is attached to an end of the door 82. The sensor 81 detects the closing of the door 82 when the protrusion 83 of the door 82 protrudes into the sensor 81, and detects the opening of the door 82 when the protrusion 83 of the door 82 does not protrude into the sensor 81.

Figure 3:
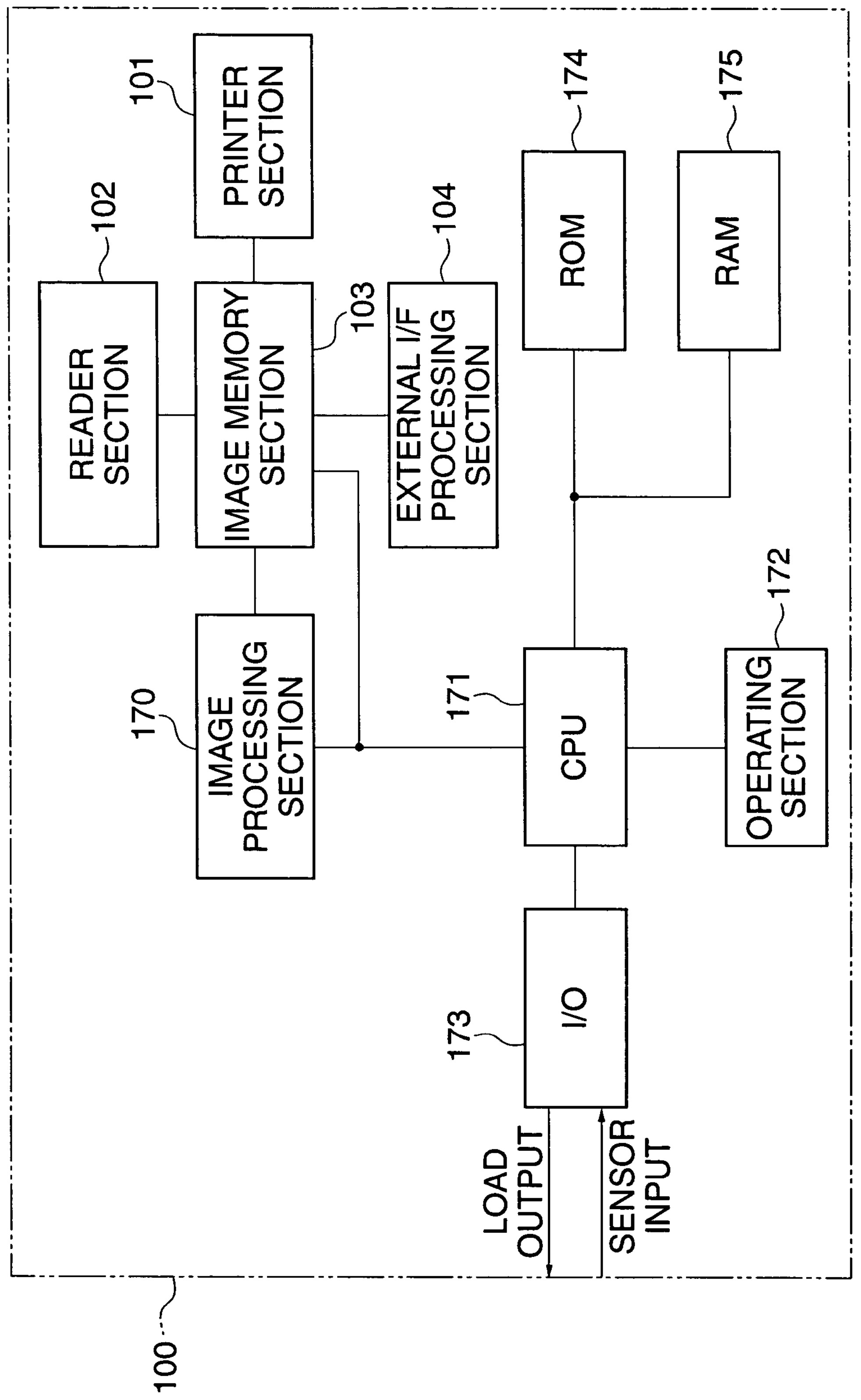
FIG. 3 is a block diagram showing the construction of a control system of the image forming apparatus in FIG. 1.

Next, a description will be given of the construction of a control system of the image forming apparatus with reference to FIG. 3. FIG. 3 is a block diagram schematically showing the construction of the control system of the image forming apparatus in FIG. 1. The image forming apparatus 100 is comprised of a printer section 101 (the image forming apparatus main body 1 appearing in FIG. 1), a reader section 102, an image memory section 103, an external interface (I/F) processing section 104, an image processing section 170, a central processing unit (CPU) 171, an operating section 172, an input/output (I/O) port 173, a ROM 174, and a RAM 175.

The CPU 171 controls the operation of the entire image forming apparatus, and to which the ROM 174 storing control programs, and the RAM 175 serving as a work area for the CPU 171 to perform various kinds of processing, the input/output port 173 via which signals are input and output are connected to the CPU 171 via an address bus and a data bus. Connected to the input/output port 173 are a variety of loads, not shown, such as motors for driving mechanisms in various sections of the image forming apparatus, clutches, sensors, not shown, for detecting the position of a recording material, and so forth. The CPU 171 sequentially provides input/output control via the input/output port 173 and carries out a sequence of image forming operations in accordance with contents (control programs) stored in the ROM 174.

Further, the operating section 172, which has a display means for displaying various screens and a key entry means for making various settings, is connected to the CPU 171. The CPU 171 controls display on the display means of the operating section 172 and controls key entry through the key entry means. That is, by operating the key entry means of the operating section 172, the operator instructs the CPU 171 to change screens in accordance with an image formation mode, a scanner reading mode, or a printout mode. In response to the instructions, the CPU 171 provides control to display the status of the image forming apparatus and operation modes set through the operation of the key entry means. Further connected to the CPU 171 are the image processing section 170 for performing processing on an electric signal converted from an optical image by the reader section 102, and the image memory section 3 for storing the processed image.

The reader section 102 reads an image on an original and converts it into an electric signal. The printer section 101, which corresponds to the image forming apparatus main body 1 appearing in FIG. 1, performs various kinds of processing such as feeding recording materials, forming images on recording materials, transferring images onto recording materials, fixing images on recording materials, and discharging recording materials. The external I/F processing section 104, described later in further detail, is located between the image memory section 103 and an external computer. The image processing section 170 performs predetermined processing on the electric signal outputted from the reader section 102. The operating section 172, which has the display means and the key entry means and is used for making various kinds of selection and various kinds of settings as described above, corresponds to the operating section 4 appearing in FIGS. 1 and 6.

Figure 4:
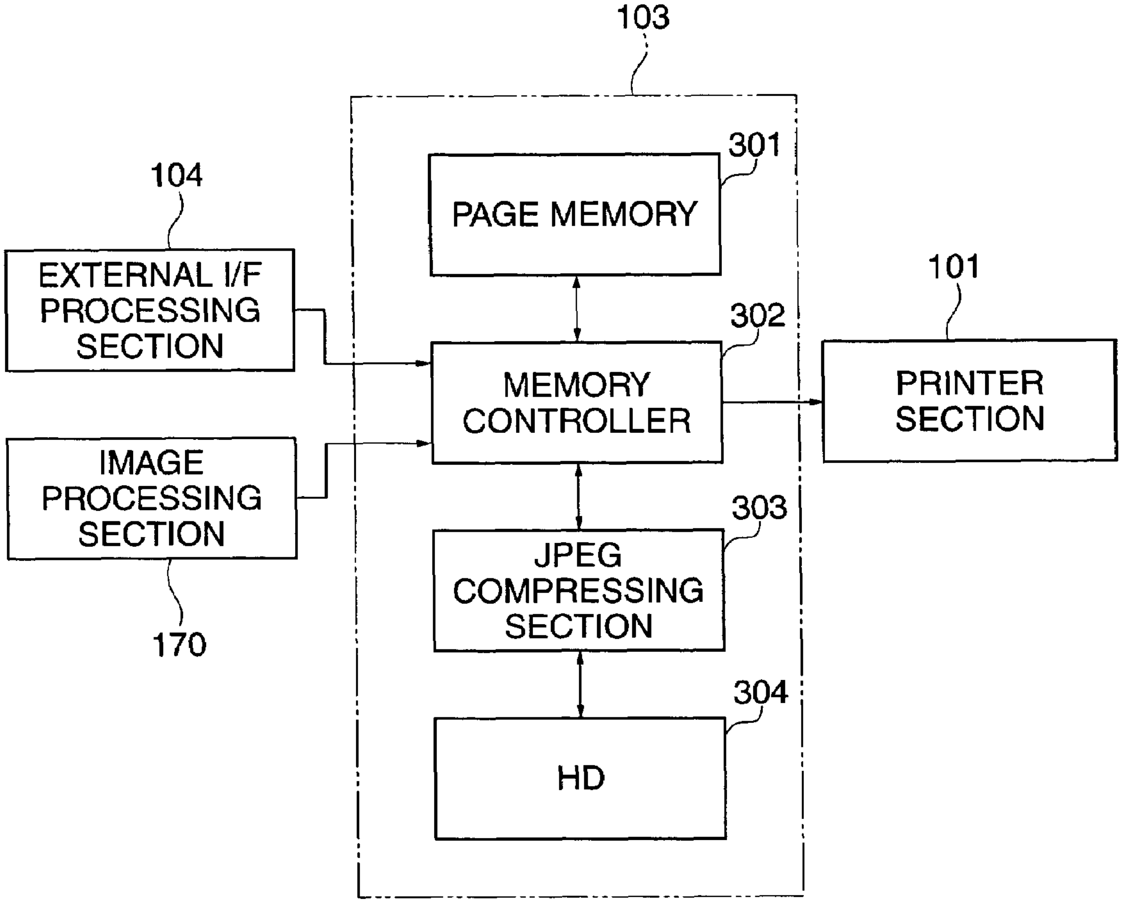
FIG. 4 is a block diagram showing the construction of an image memory section.

A description will now be given of the detailed construction of the image memory section 3 with reference to FIG. 4. FIG. 4 is a block diagram schematically showing the construction of the image memory section 103. The image memory section 103 is comprised of a page memory 301, a memory controller 302, a JPEG (Joint Photographic Experts Group) compressing section 303, and a hard disk (HD) 304.

In the image memory section 103, a memory controller 302 provides control to carry out writing image data supplied from the external I/F processing section 104 and the image processing section 170 to the page memory 301, which is implemented by a DRAM or the like, reading image data from the page memory 301 to the printer section 101, and access to the hard disk 404 as a mass storage device for input and output of image data to and from the hard disk 404. The memory controller 302 causes generation of a DRAM refresh signal for the page memory 301, and controls access to the page memory 301 from the external I/F processing section 104, the image processing section 170, and the hard disk 304.

Further, in the image memory section 103, the address of writing in the page memory 301 and the address, direction, etc. of readout from the page memory 301 are controlled in accordance with instructions given from the CPU 171. As a result, the CPU 171 controls various functions such as a function of arranging or laying out a plurality of original images in the page memory 301 and outputting the laid out image data to the printer section 101, a function of cutting out and outputting a part of an image, and a function of rotating an image. The JPEG compressing section 303 carries out JPEG compression of an image.

Figure 5:
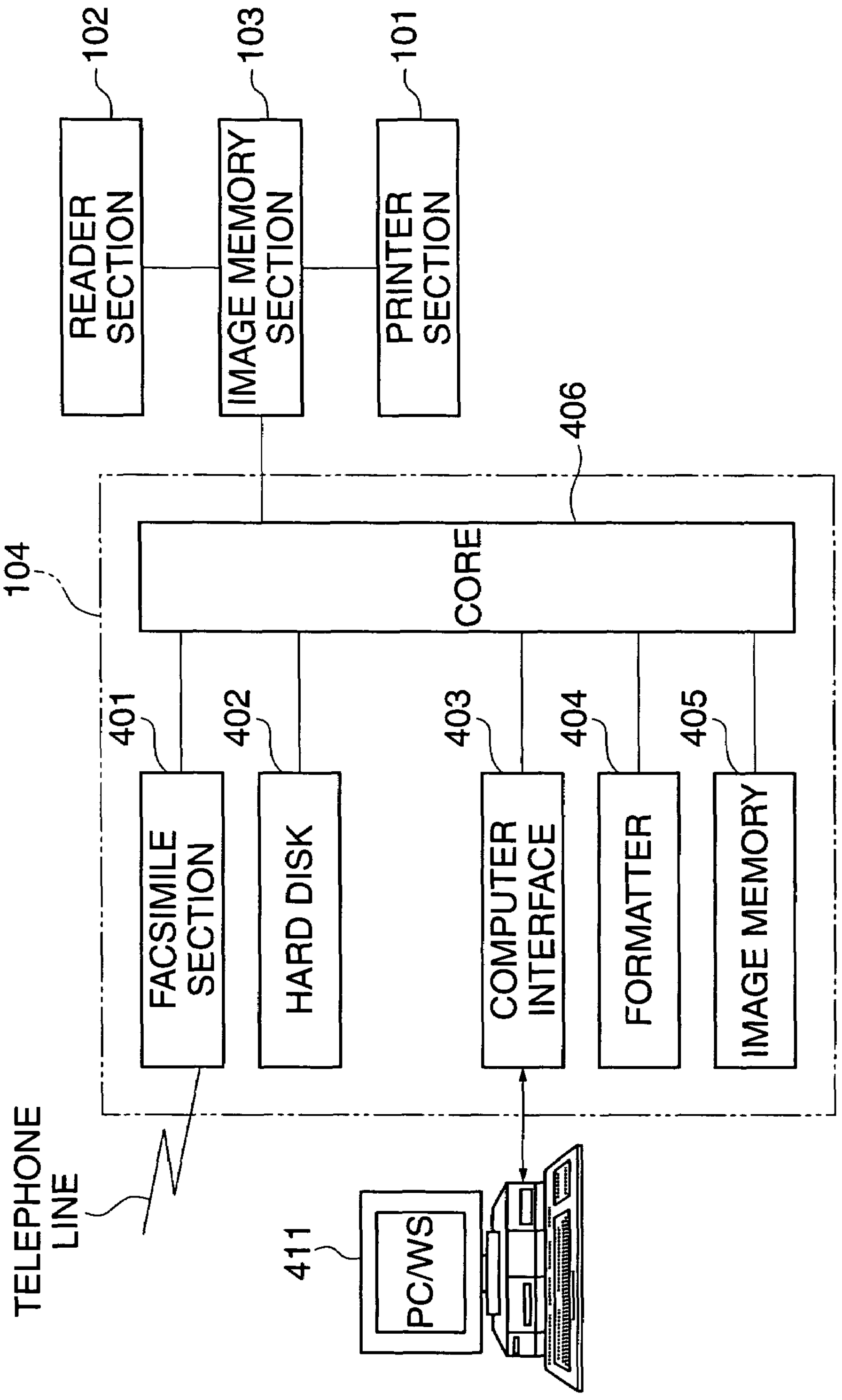
FIG. 5 is a block diagram showing the construction of an external I/F processing section.

A description will now be given of the construction of the external I/F processing section 104 with reference to FIG. 5. FIG. 5 is a block diagram schematically showing the construction of the external I/F processing section 104. The external I/F processing section 104 includes a facsimile section 401, a hard disk 402, a computer interface 403, a formatter 404, an image memory 405, and a core 406. An external computer (personal computer or a work station) 411 is connected to the computer interface 403.

As described above, the external I/F processing section 104 captures image data from the reader section 102 via the image memory section 103, and outputs the image data to the printer section 101 via the image memory section 103 so that an image can be formed by the printer section 101.

The facsimile section 401 is connected to a public line such as a telephone line via a modem, not shown, and receives and transmits facsimile communication data from and to the public line. The facsimile section 401 stores facsimile images in the hard disk 402 so as to transmit image data at a designated time or to transmit image data in response to an inquiry about a password from someone. In this way, once an image has been transferred from the reader section 102 to the facsimile section 401 or to the hard disk 402 for facsimile via the image memory section 103, the image can be transmitted by facsimile without using the reader section 102 and the image memory section 103 for facsimile. The hard disk 402 stores image data, which are to be communicated via facsimile by the facsimile section 401.

The computer interface 403 carries out data communication with the external computer 411, and includes a local area network (hereinafter referred to as "the LAN"), a serial I/F, an SCSI (Small Computer System Interface) I/F, a Centronics I/F for inputting data to the printer section 101, and so forth. The computer interface 403 notifies the external computer 411 of the statuses of the printer section 101 and the reader section 102, transfers images read by the reader section 102 to the external computer 411 in accordance with instructions given from the external computer 411, and receives print image data from the external computer 411 via the above-mentioned I/Fs.

The formatter 404 performs data processing as described below. That is, print data supplied from the external computer 411 via the computer interface 403 is written in an exclusive printer code. Accordingly, the formatter 404 converts the printer data written in the printer code into raster image data based on which image formation is to be carried out by the printer section 101 via the image memory section 103. The formatter 404 also expands the raster image data in the image memory 405.

The image memory 405 serves as a memory where the formatter 404 expands the raster image data as above. Further, when transmitting an image read by the reader section 102 to the external computer 411 via the computer interface 403 (an image scanner function), the image memory 405 once expands image data transmitted from the image memory section 103 so that the image data can be converted into data in a suitable format for transmission to the external computer 411 and then transmitted via the computer interface 403.

The core 406 controls and manages data transfer between the facsimile section 401, the computer interface 403, the formatter 404, the image memory 405, and the image memory section 103. As a result, whether a plurality of image output sections are connected to the external I/F processing section 104 or there is only one image transfer path to the image memory section 103, exclusive control and priority control are provided to output an image under the control of the core 406.

Figure 6:
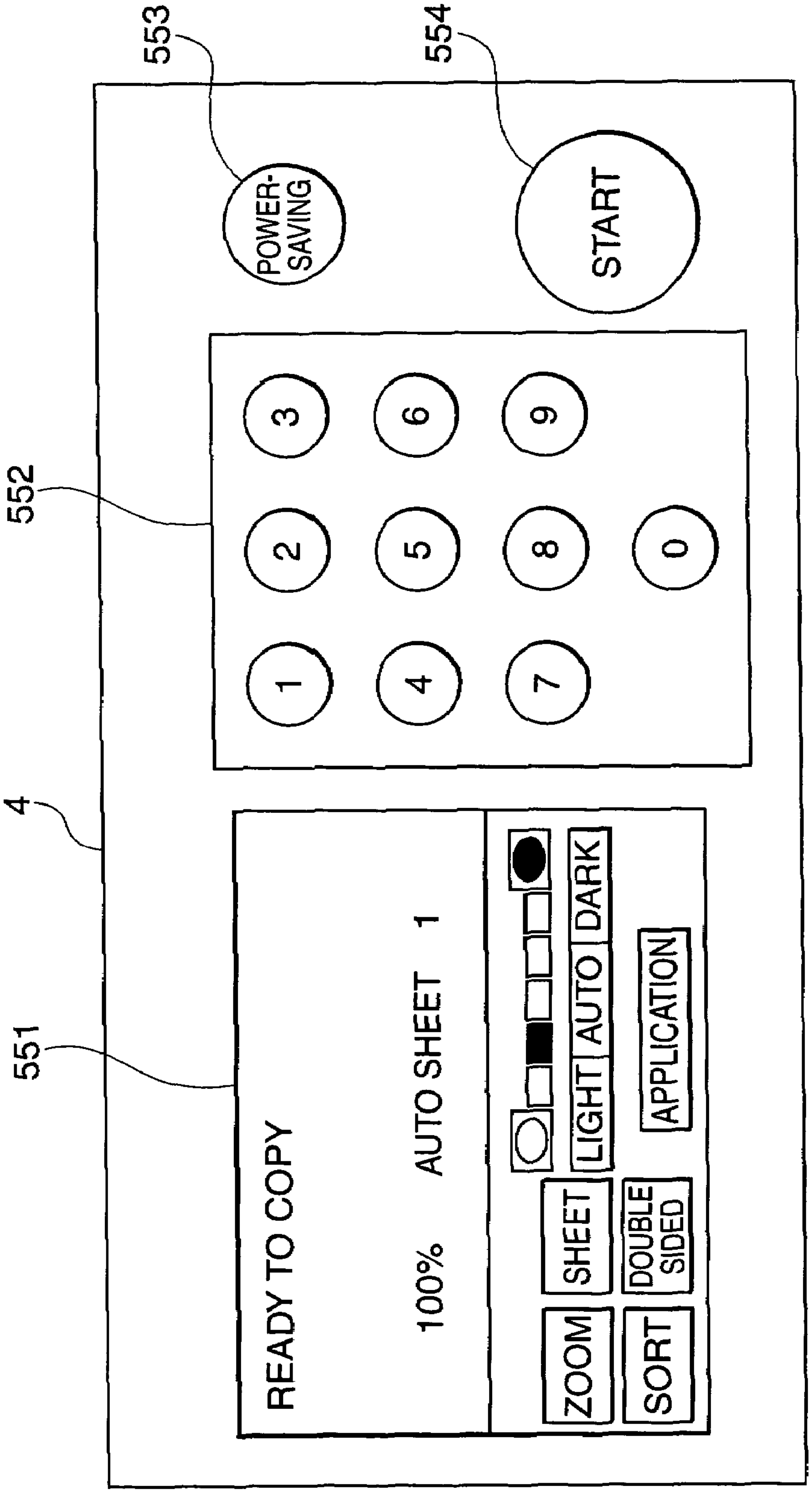
FIG. 6 is a diagram showing the panel layout of an operating section.

The panel layout of the operating section will now be described by referring to FIG. 6. FIG. 6 is a view showing the panel layout of the operating section 4. The operating section 4 is comprised of a setting screen 551, numeric buttons 552, a power-saving button 553, and a start button 554.

The setting screen 551 is comprised mainly of a setting region for setting sheet types to be used for copy, the copy magnification, and so forth, and a display region for displaying settings, for example. A variety of information items relating to a copying function of the image forming apparatus can be set and displayed on the setting screen 551, although detailed description thereof is omitted. The numeric buttons 552 are mainly used for setting the number of sheets to be copied. The power-saving button 553 is depressed to bring the image forming apparatus from a normal mode to a power-saving mode or to bring the image forming apparatus from the power-saving mode to the normal mode. That is, the power-saving button 553 serves as a power-saving initiating button and a power-saving terminating button. The power-saving button 553 is extinguished in the normal mode, and is lighted in green in the power-saving mode. The start button 554 is depressed by the user who wants to make a copy using the image forming apparatus.

The gist of the present invention lies in automatic adjustment that is selectively carried out or not according to the status of the image forming apparatus. Adjustments carried out by the image forming apparatus according to the present embodiment include in-printing adjustment which is necessarily carried out when printing, and the automatic adjustment which is carried out as the need arises. Although a large number of items are subjected to such adjustments, a description will be given of e.g. a toner density adjusting mechanism which adjusts the density of a developing agent (toner) to be used by the developing devices of the image forming apparatus.

In general, a two-component developing agent composed mainly of toner particles and carrier particles is used for developing devices provided in image forming apparatuses of an electrophotographic type or an electrostatic recording type. In particular, the two-component developing agent is used for almost all of developing devices provided in color image forming apparatuses which form a full-color image or a multi-color image. As is well known, the toner density of the two-component developing agent (i.e. the percentage of toner particle weight relative to the total weight of carrier particles and toner particles) is an extremely important factor in making the image quality stable.

For this reason, there is provided a toner density adjusting device (ATR), which is comprised of a toner density detecting means for detecting the toner density of a two-component developing agent and a control means for supplying toner to a developing device according to the detected toner density signal so as to maintain a constant toner density of the two-component developing agent. Examples of the toner density detecting means for detecting the toner density of a two-component developing agent include a toner density sensor of an optical reflected light quantity detecting type which irradiates a ray of light upon a two-component developing agent and receives the light reflected from the two-component developing agent to detect the toner density, and a toner density sensor of an inductance detecting type which detects the inductance of a two-component developing agent to detect the toner density.

Figure 7:
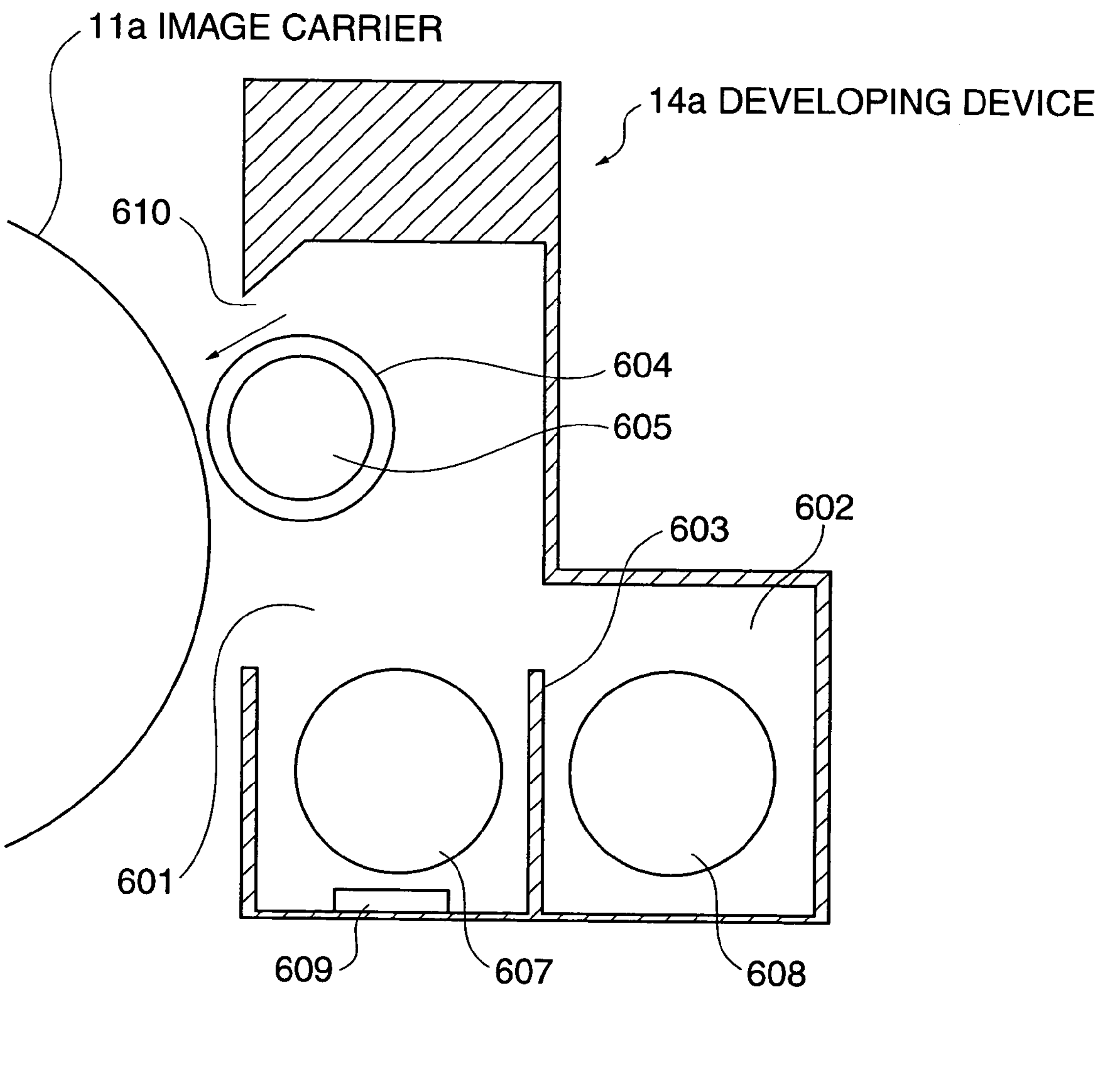
FIG. 7 is a view schematically showing the construction of a developing device.

Referring next to FIG. 7, a description will be given of the construction of the developing device 14*a* among the developing agents 14*a* to 14*d* provided in the image forming apparatus according to the present embodiment. FIG. 7 is a view schematically showing the construction of the developing device 14*a*. The other developing devices 14*b* to 14*d* are identical in construction with the developing device 14*a*. In the present embodiment, the toner density is detected using the inductance detecting type toner density sensor. The developing device 14*a* is disposed in opposed relation to the image carrier 11*a* comprised of a photosensitive member or an inductor. The interior of the developing device 14*a* is divided into a developing chamber (first chamber) 601 and an agitating chamber (second chamber) 602 by a partition 603 extending in the vertical direction. There is an open space above the partition 603 so that the residue of a two-component developing agent in the developing agent 601 can be collected in the agitating chamber 602. In the present embodiment, a two-component developing agent composed of a nonmagnetic toner and a magnetic carrier is stored in the developing chamber 601 and the agitating chamber 602.

First and second screw type developing agent agitating/conveying means 607 and 608 are disposed in the developing chamber 601 and the agitating chamber 602, respectively. The first developing agent agitating/conveying means 607 agitates and conveys the developing agent stored in the developing chamber 601. The second developing agent agitating/conveying means 608 agitates and conveys a toner supplied from a toner supply tank, not shown, via a toner supply inlet formed in an upper part of an upstream side of the second developing agent agitating/conveying means 608 and the developing agent already stored in the agitating chamber 602, so that the toner density can be made uniform.

Developing agent passages, not shown, for communication between the developing chamber 601 and the agitating chamber 602 are formed at both ends of the partition 603. A conveying force of the developing agent agitating/conveying means 607 and 608 causes the developing agent, whose toner density has been decreased due to toner consumption for development, to move from the developing chamber 601 into the agitating chamber 602 through one of the developing agent passages, and causes the developing agent, whose toner density has returned to the original density, to move from the agitating chamber 602 into the developing chamber 601 through the other one of the developing agent passages.

The developing chamber 601 has an opening 610 formed at a location corresponding to a developing area opposed to the image carrier 11*a*. In the opening 610, a development sleeve 604 as a development agent carrier is rotatably disposed while being partially projected from the opening 610. The development sleeve 604 is made of a nonmagnetic material, and rotates in a direction indicated by the arrow in FIG. 7. A magnet 605 as a magnetic field generating means is fixed in the developing sleeve 604. The development sleeve 604 carries and conveys a layer of the two-component developing agent whose layer thickness is restricted by a blade, and develops a latent image on the image carrier 11*a* by causing the developing agent to be attached to the latent image on the image carrier 11*a* in the developing area opposed to the image carrier 11*a*. To improve the developing efficiency, i.e. the ratio of toner applied to the latent image, a development bias voltage composed of a direct current voltage and an alternating current voltage superimposed one upon the other is applied to the development sleeve 604.

The inductance detecting type toner density sensor is used for detecting variations in inductance of the two-component developing agent. Accordingly, the inductance detecting type toner density sensor needs to be disposed at a location where the flow and compression of the developing agent are constant, e.g. at a side or bottom of the developing device so that variations in inductance can be detected in a stable manner. Further, the inductance detecting type toner density sensor needs to be disposed downstream of the developing chamber 601 so as to detect variations in toner density. For this reason, usually the inductance detecting type toner density sensor (inductance head) 609 is disposed at the bottom of the developing device downstream of the developing chamber 601 to detect the toner density by detecting the inductance which varies as the toner amount of the two-component developing agent varies.

Figure 8:
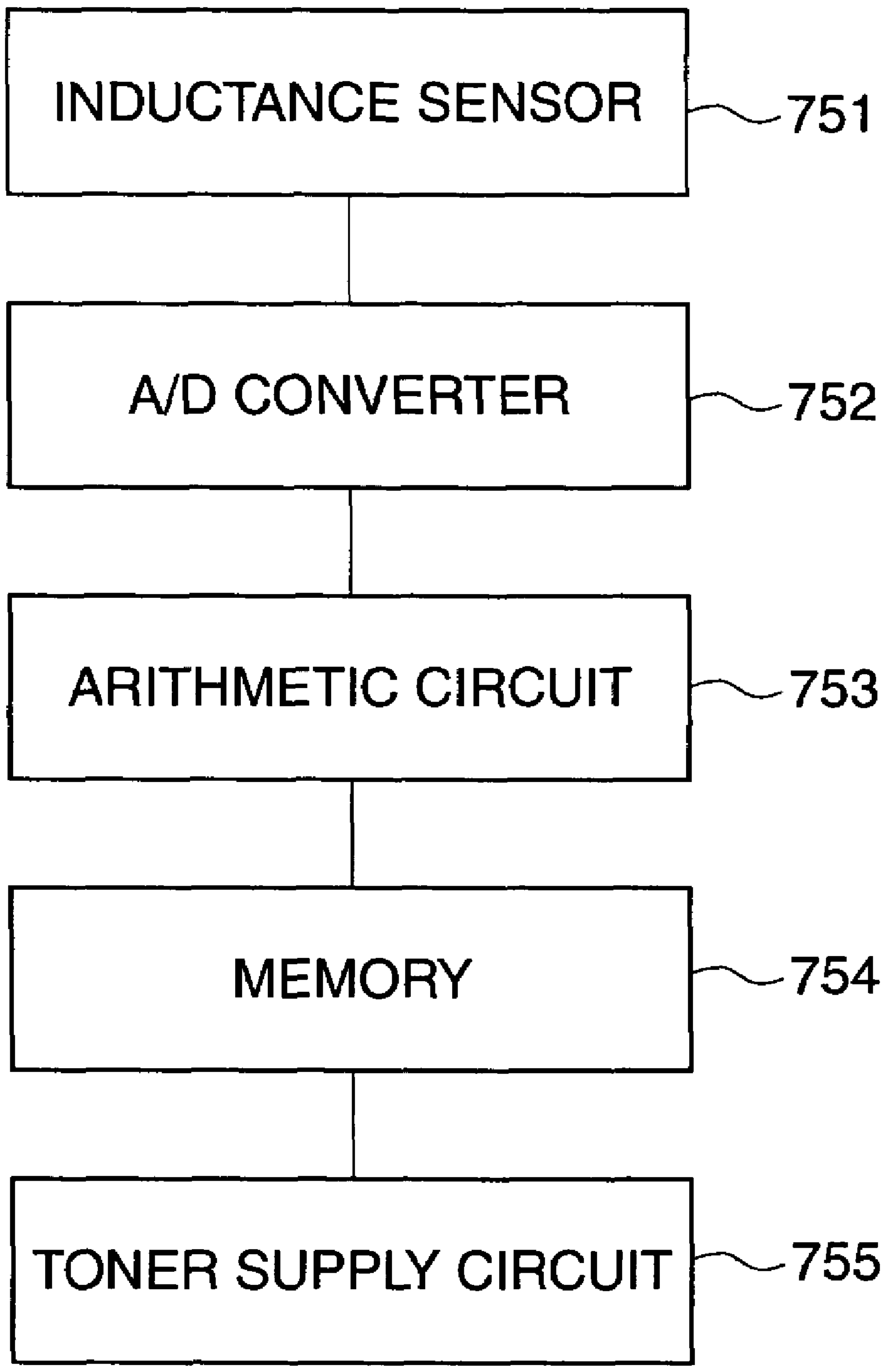
FIG. 8 is a block diagram showing the construction of a first toner density adjusting section.

A description will now be given of a first toner density adjusting process and a second toner density adjusting process, which are carried out in adjusting the toner density. FIG. 8 is a block diagram showing the construction of a first toner density adjusting section including an inductance sensor. The first toner density adjusting section is comprised of an inductance sensor 751, an analog-to-digital converter (A/D converter) 752, an arithmetic circuit 753, a memory 754, and a toner supply circuit 755.

First, a description will be given of initialization for toner density adjustment. In the toner density adjustment, it is necessary to correct a reference value of the toner density and to correct for errors in detection by the inductance sensor 751. The reference value of the toner density is stored in advance in the memory 754. In the case where a new developing device 14*a* is attached to the image forming apparatus at the time of shipment from a factory or by replacement, the density of toner in the developing device 14*a* is set to the optimum ratio.

Whether the developing device 14*a* is a new one or not can be determined according to the number of times of use written in a memory tag, not shown, which is attached to the developing device 14*a*. If it is determined that the developing device 14*a* is a new one when the image forming apparatus starts operating, the developing device 14*a* carries out correction for errors in detection by the inductance sensor 751. Since the new developing device 14*a* has the optimum toner density, the density of toner in the developing device 14*a* should be equal to the reference value of the toner density stored in advance in the memory 754. For example, if the detection value of the inductance sensor 751 is a value of N±10 where the reference value of the toner density is represented by N, it is determined that the error in detection by the inductance sensor 751 is ±10 relative to the value N. Accordingly, values subsequently detected by the inductance sensor 751 are corrected by ±10 or the inductance sensor 751 itself is adjusted so as to adjust the detection value of the inductance sensor 751.

A description will now be given of the first toner density adjusting process with reference to FIGS. 7 to 9. When the image forming apparatus starts image formation and the development sleeve 604 and the first and second developing agent agitating/conveying means 607 and 608 of the developing device start rotating, the inductance sensor 751 detects the density of toner in the developing device. A signal indicative of the density of toner in the developing device, which is detected by the inductance sensor 751, is amplified as the need arises, and is then converted into a digital signal by the A/D converter 752 and transmitted to the arithmetic circuit 753. The arithmetic circuit 753 finds a difference between the input signal and the reference value by comparison, calculates a variation in toner density from the difference, and sends a toner density variation signal indicative of the variation to the toner supply circuit 755. The toner supply circuit 755 drives a driving means, not shown, for the toner supply tank for a supply time period converted from the variation in toner density so as to supply a required amount of toner.

Figure 9:
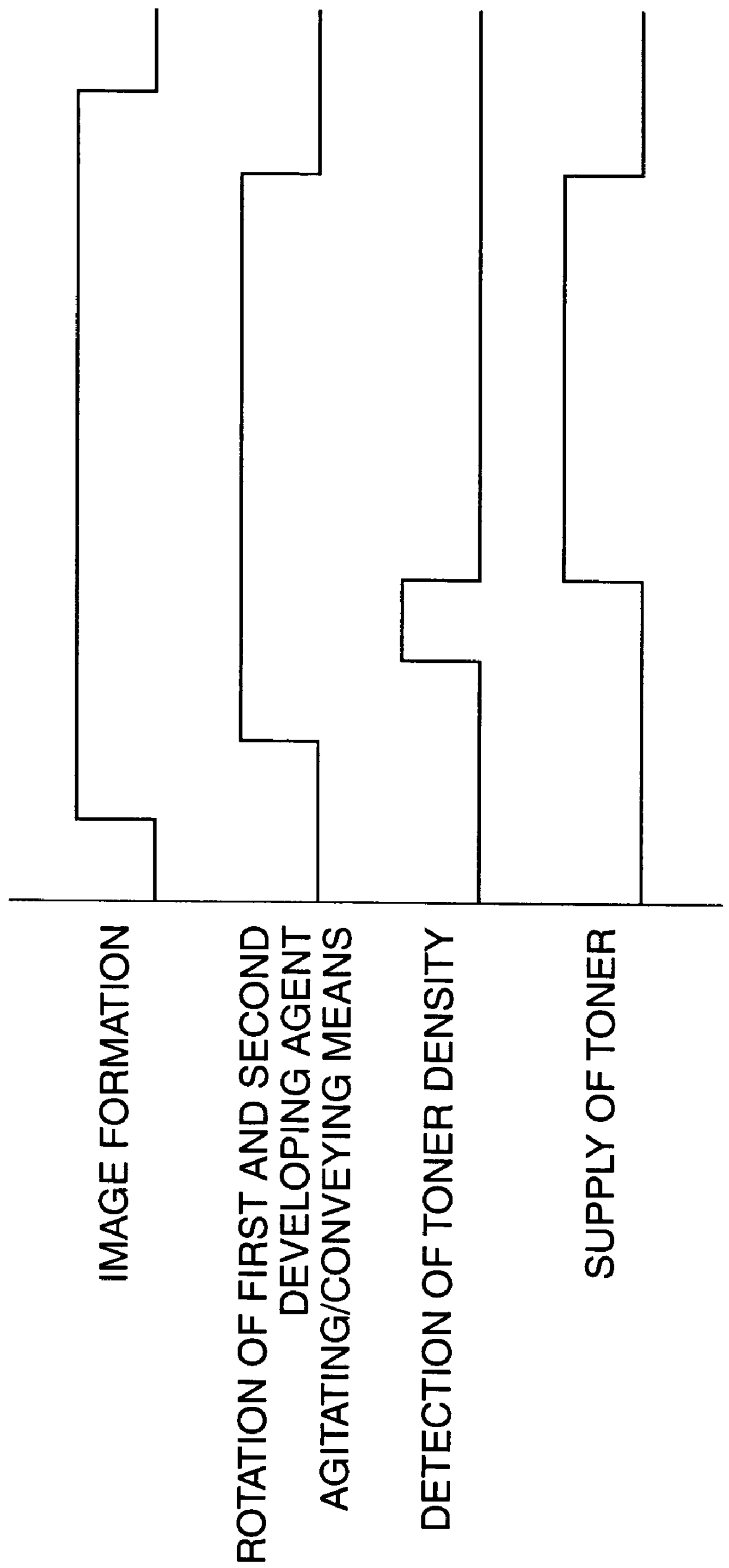
FIG. 9 is a timing chart useful in explaining a first toner density adjusting process.

FIG. 9 is a timing chart showing the relationship between the above described sequence of operations (image formation, rotation of the first and second developing agent agitating/conveying means 607 and 608, detection of the toner density, and supply of toner). As shown in FIG. 9, the first density adjusting process is carried out each time image formation is carried out. That is, the first toner density adjusting process corresponds to the above described in-printing adjustment which is necessarily carried out when printing is performed.

A description will now be given of the second toner density adjusting process. The second toner density adjusting process is one of automatic adjustments carried out as the need arises. In a two-component developing agent composed mainly of toner particles and carrier particles, toner deterioration may occur due to application of voltage for a long period of time. This results in a variation in the ratio of the toner particles to the carrier particles, which is detected by the inductance sensor 751. For example, assuming that the value detected by the inductance sensor 751 in the case where no toner deterioration occurs is represented by X, if toner deterioration occurs due to application of voltage for a long period of time while toner is not used, the value detected by the inductance sensor 751 varies in the range of X±10. Due to this variation, in the above described first toner density adjusting process, it may be erroneously determined that there is no necessity of supplying toner according to the result of calculation from the value detected by the inductance sensor 751, even though the actual print image shows a decrease in the toner density.

In the present embodiment, to prevent such erroneous determination, the second toner density adjusting process is carried out such that the patch sensor 77 detects the toner density of a patch-like reference image formed on the intermediate transfer belt 30 in predetermined timing, so that whether toner has been supplied excessively or insufficiently is determined and the reference value N of the inductance sensor 751 is corrected based on the determination result.

Figure 10:
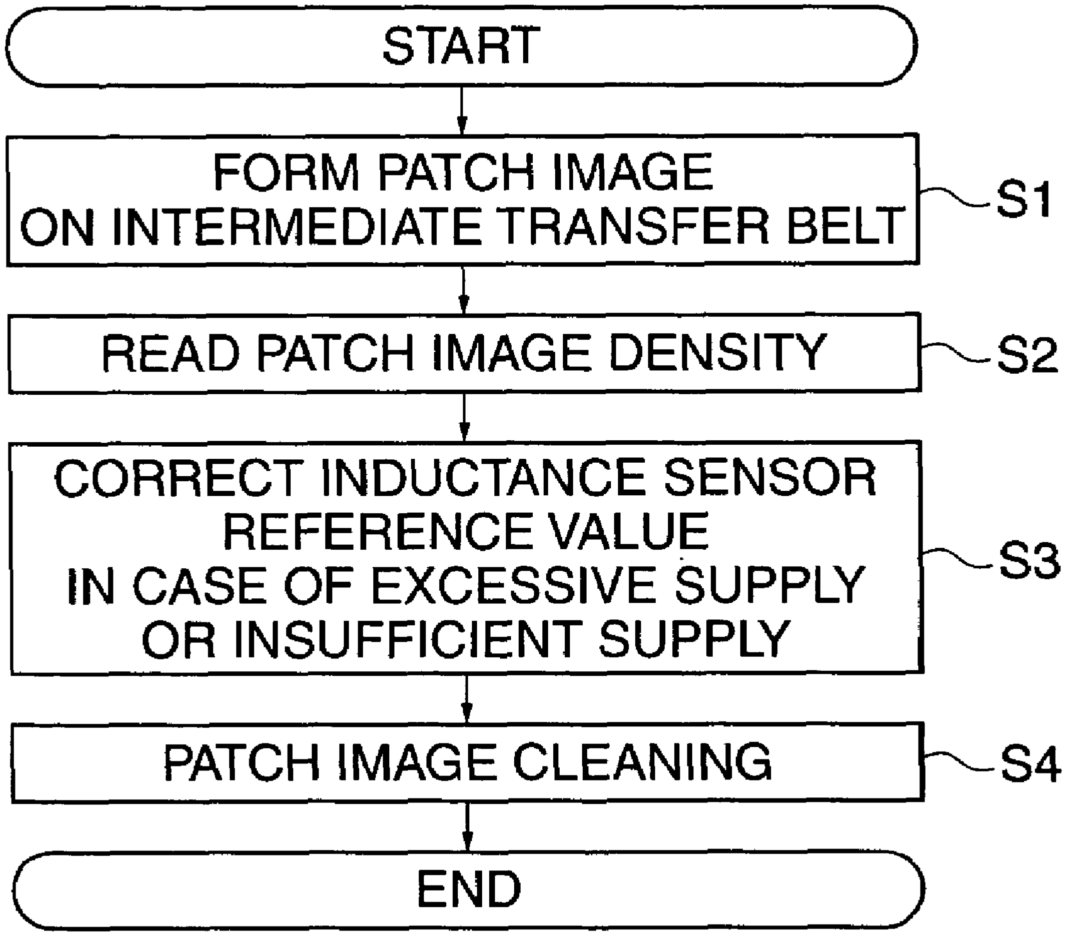
FIG. 10 is a flow chart showing the procedure of a second tone density adjusting process.
Figure 11:
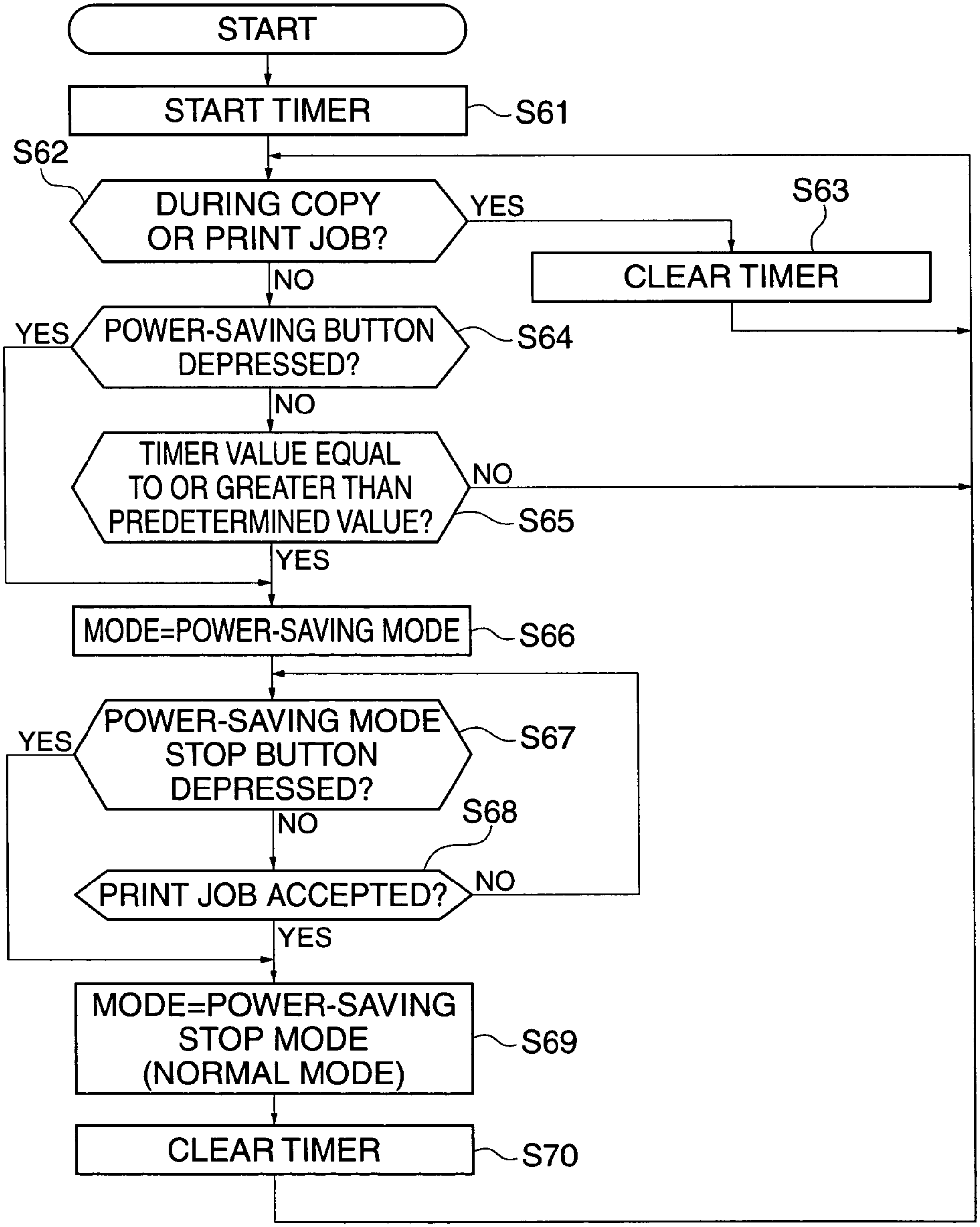
FIG. 11 is a flow chart showing a power-saving mode transition determining process.

A description will now be given of the operation of the image forming apparatus according to the present embodiment constructed as above, with reference to FIGS. 10 to 12.

First, the above described second toner density adjusting process will be described. FIG. 10 is a flow chart showing the procedure of the second toner density adjusting process. This process is executed by the CPU 171 in accordance with a control program stored in the ROM 174.

First, in a step S1, the CPU 171 controls the image forming section and the intermediate transfer section to form a patch-like reference image on the intermediate transfer belt 30. On this occasion, it is unnecessary to feed a recording material since the patch-like reference image need not be transferred onto a recording material. Next, in a step S2, an output value of the patch sensor 77 is fetched to read the image density (toner density) of the patch-like reference image formed on the intermediate transfer belt 30. The patch sensor 77 is implemented by e.g. a photodiode, which detects a ray of light reflected from the intermediate transfer belt 30, and is configured to output smaller values for higher image densities and output greater values for lower image densities.

Then, in a step S3, the CPU 171 determines whether the toner density is appropriate or not, from an output value from the patch sensor 77. If the result of this determination shows that toner has been supplied excessively or insufficiently, it can be determined that the toner density reference value N used in the above described first toner density adjusting process is different from the toner density which should be obtained according to the actual usage condition. Therefore, the CPU 171 corrects the toner density reference value N. Then, in a step S4, the CPU 171 causes the cleaning device 50 to clean off the patch-like reference image formed on the intermediate transfer belt 30, followed by the process being terminated.

The above described second toner density adjusting process is carried out each time automatic adjustment is carried out as the need arises, so that a difference between the actual image density and the amount of supplied toner found from the toner density detected by the inductance sensor 751 is detected and a correction is made for the difference. In this way, an error in detection by the inductance sensor 751, which is caused by the first toner density adjusting process, is corrected as appropriate.

A description will now be given of a process for making a determination as to whether the image forming apparatus is to be brought into the power-saving mode or not with reference to FIG. 11. FIG. 11 is a flow chart showing the process for making a determination as to whether the image forming apparatus is to be brought into the power-saving mode or not. This process is started in response to turning-on of power supply for the image forming apparatus, and is executed by the CPU 171 in accordance with a control program stored in the ROM 174.

First, in a step S61, the CPU 171 causes a timer to start measuring time. This timer is used for determining whether the image forming apparatus is to be brought into the power-saving mode or not. After the execution of the step S61, the process proceeds to a step S62 wherein the CPU 171 determines whether the image forming apparatus is currently copying or executing a print job. If it is determined in the step S62 that the image forming apparatus is currently copying or executing a print job, the process proceeds to a step S63 wherein the CPU 171 causes the timer to clear its count value, and the process returns to the step S62. If it is determined in the step S62 that the image forming apparatus is not currently copying nor executing a print job, the process proceeds to a step S64 wherein the CPU 171 determines whether the power-saving button 53 of the operating section 4 has been depressed or not. In this case, it is determined whether the power-saving button 553 has been depressed or not in an extinguished state i.e. in the normal mode of the image forming apparatus.

If it is determined in the step S64 that the power-saving button 553 has been depressed, the process proceeds to a step S66 wherein the CPU 171 sets the operation mode of the image forming apparatus to the power-saving mode. If it is determined in the step S64 that the power-saving button 553 has not been depressed, the process proceeds to a step S65 wherein the CPU 171 determines whether or not the count value of the timer is equal to or greater than a predetermined value. The predetermined value can be set e.g. in a service mode, not shown, and is set to three hours in the present embodiment. If it is determined in the step S65 that the count value of the timer is not equal to or greater than the predetermined value, the process returns to the step S62. If it is determined in the step S65 that the count value of the timer is equal to or greater than the predetermined value, the process proceeds to the step S66 wherein the CPU 171 sets the operation mode of the image forming apparatus to the power-saving mode. It should be noted that in the power-saving mode, such a process is carried out that power consumption is saved, but in this process of the step S66, such processing is only performed that the power-saving mode is set and controllers for other processes are notified that the image forming apparatus is in the power-saving mode.

After the execution of the step S66, the process proceeds to a step S67 wherein the CPU 171 determines whether the power-saving button 553 has been depressed or not. In this case, it is determined whether the power-saving button has been depressed or not while the power-saving button 553 is lighted in green, i.e. in the power-saving mode of the image forming apparatus. If it is determined in the step S67 that the power-saving button 553 has been depressed, the process proceeds to a step S69 wherein the CPU 171 releases the power-saving mode and sets the operation mode to the normal mode. If it is determined in the step S67 that the power-saving button 553 has not been depressed, the process proceeds to a step S68 wherein the CPU 171 determines whether a print job has been accepted or not. In the power-saving mode, the screen 551 of the operating section 4 is off and the start button 554 is inhibited from being depressed, and hence the power-saving button 553 must be depressed whenever copying is desired in the power-saving mode. Therefore, it suffices here that only a determination is made as to whether a print job has been started or not.

If it is determined in the step S68 that the print job has not been accepted, the process returns to the step S67. If it is determined in the step S68 that the print job has been accepted, the process proceeds to the step S69 wherein the CPU 171 releases the image forming apparatus from the power-saving mode and sets the operation mode to the normal mode. After the execution of the step S69, the process proceeds to a step S70 wherein the CPU 171 clears the timer, and the process then returns to the step S62.

Figure 12:
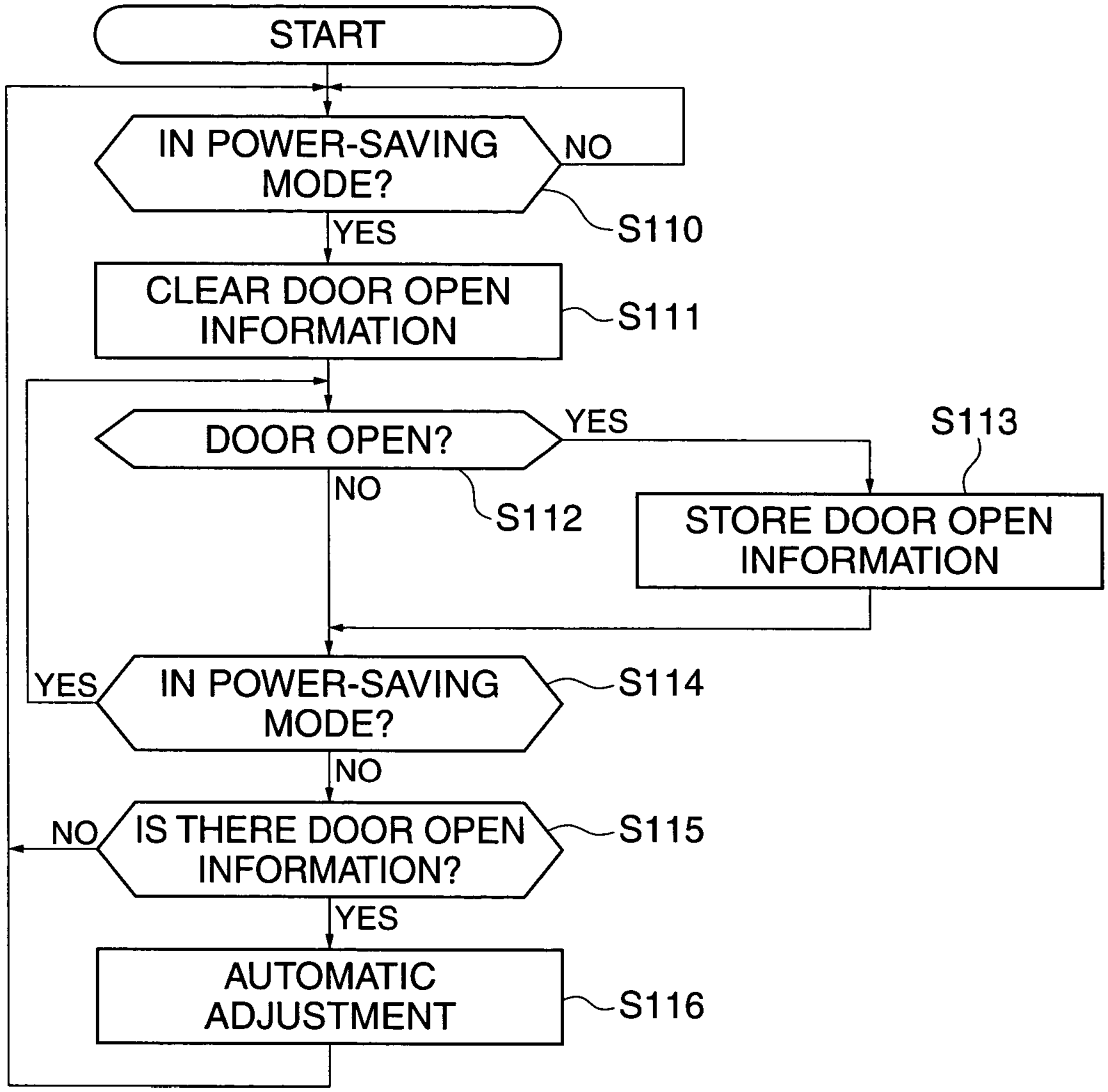
FIG. 12 is a flow chart showing a process executed when the image forming apparatus returns from a power-saving mode to a normal mode.

Referring next to FIG. 12, a description will be given of a process executed when the image forming apparatus returns from the power-saving mode to the normal mode. FIG. 12 is a flow chart showing the process executed when the image forming apparatus returns from the power-saving mode to the normal mode. This process is started in response to turning-on of power supply for the image forming apparatus, and is executed by the CPU 171 in accordance with a control program stored in the ROM 174.

First, in a step S110, the CPU 171 determines whether the image forming apparatus is in the power-saving mode or not. If it is determined in the step S110 that the image forming apparatus is not in the power-saving mode, the step S110 is repeated until the image forming apparatus enters the power-saving mode. If it is determined in the step S110 that the image forming apparatus is in the power-saving mode, the process proceeds to a step S111 wherein the CPU 171 clears door-open information. This door-open information is stored as information indicative of the door 82 of the image forming apparatus being opened in the power-saving mode. After the execution of the step S111, the process proceeds to a step S112 wherein the CPU 171 determines whether the door 82 of the image forming apparatus is opened or not according to an output from the sensor 81 disposed in the image forming apparatus.

If it is determined in the step S112 that the door 82 of the image forming apparatus is opened, the process proceeds to a step S113 wherein the CPU 171 stores the door-open information indicative of the door 82 being opened, and the process then proceeds to a step S114. If it is determined in the step S112 that the door 82 of the image forming apparatus is closed, the process proceeds to the step S114 wherein the CPU 171 determines whether the image forming apparatus is in the power-saving mode or not. If it is determined in the step S114 that the image forming apparatus is in the power-saving mode, the process returns to the step S112. If it is determined in the step S114 that the image forming apparatus is not in the power-saving mode, the process proceeds to a step S115 wherein the CPU 171 determines whether the door-open information indicative of the door 82 of the image forming apparatus being opened is stored or not.

If it is determined in the step S115 that the door-open information indicative of the door 82 of the image forming apparatus being opened is not stored, the process returns to the step S110. If it is determined in the step S115 that the door-open information indicative of the door 82 of the image forming apparatus being opened is stored, the process proceeds to a step S116 wherein the CPU 171 carries out automatic adjustment, and the process then returns to the step S110. The automatic adjustment in the step S116 is for adjusting e.g. conditions for printing an image. In the automatic adjustment, various kinds of processes are carried out; in the present embodiment, the second toner density adjusting process described above with reference to FIG. 10 is carried out, for example.

In the above described process, only in the case where the door 82 of the image forming apparatus is opened in the power-saving mode, the automatic adjustment is carried out for the following reasons. That is, when the door 82 of the image forming apparatus is opened in the power-saving mode, it is presumed that the user accesses the interior of the image forming apparatus for carrying out an operation (such as jam removing processing or cartridge replacement), and depending on the operation, a desirable image cannot be easily obtained. For this reason, in the case where the door 82 is opened in the power-saving mode, the above described automatic adjustment is carried out, and in the case where the door 82 is not opened in the power-saving mode, the process is terminated without carrying out the automatic adjustment so that the image forming apparatus can return to the normal mode as quickly as possible to immediately start printing.

It should be noted that in the present embodiment, whether the automatic adjustment is selectively carried out or not according to whether the door 82 is opened or not in the power-saving mode of the image forming apparatus, but the automatic adjustment may be necessarily carried out and the details of the automatic adjustment may be changed.

As described above, according to the present embodiment, information indicative of the opening/closing of the door in the power-saving mode of the image forming apparatus is stored, and if the need arises according to the stored information, the automatic adjustment is carried out, and if the need does not arise according to the stored information, the image forming apparatus returns to the normal mode without carrying out the automatic adjustment. In this way, the automatic adjustment is selectively carried out or not in the return process, and hence it is possible to operate the image forming apparatus in a stable condition and in an efficient manner.

A description will now be given of a second embodiment of the present invention. An image forming apparatus according to the second embodiment is identical in basic construction with the image forming apparatus according to the above described first embodiment. The second embodiment differs from the first embodiment only in the process executed when the image forming apparatus returns from the power-saving mode to the normal mode in the first embodiment described above with reference to FIG. 12. Therefore, only the process executed when the image forming apparatus returns from the power-saving mode to the normal mode will be described below with reference to FIG. 13 with descriptions referring to FIGS. 1 to 11 being omitted.

Figure 13:
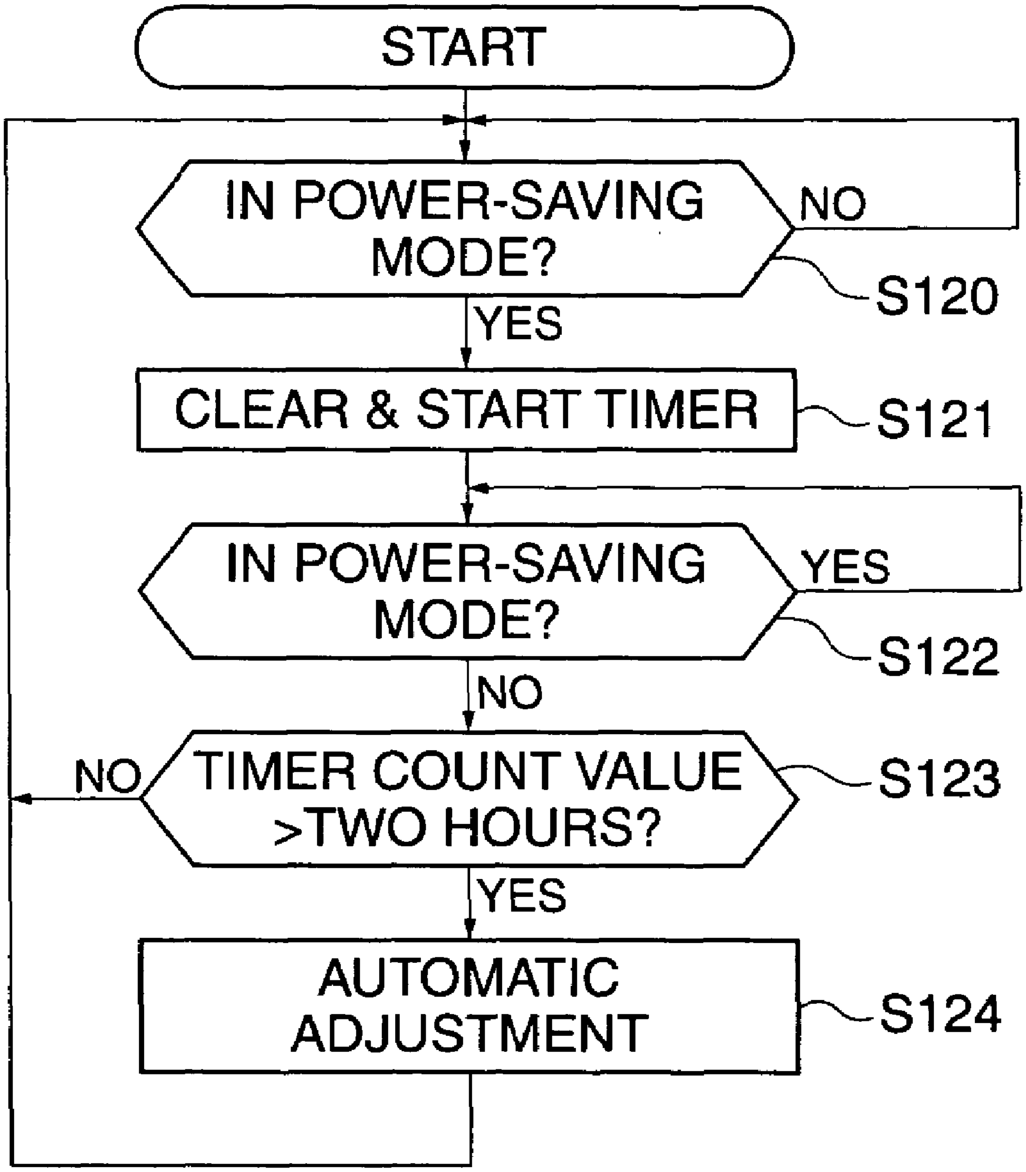
FIG. 13 is a flow chart showing a process executed when the image forming apparatus returns from a power-saving mode to a normal mode according to a second embodiment of the present invention.

FIG. 13 is a flow chart showing the process executed when the image forming apparatus returns from the power-saving mode to the normal mode.

This process is started in response to turning-on of power supply for the image forming apparatus, and is executed by the CPU 171 in accordance with a control program stored in the ROM 174.

First, in a step S120, the CPU 171 determines whether the image forming apparatus is in the power-saving mode or not. If it is determined in the step S120 that the image forming apparatus is not in the power-saving mode, the process returns to the step S120 (the step S120 is repeated until the image forming apparatus enters the power-saving mode). If it is determined in the step S120 that the image forming apparatus is in the power-saving mode, the process proceeds to a step S121 wherein the CPU 171 clears the timer and causes the timer to start measuring time. After the execution of the step S121, the process proceeds to a step S122 wherein the CPU 171 determines whether the image forming apparatus is in the power-saving mode or not. If it is determined in the step S122 that the image forming apparatus is in the power-saving mode, the CPU 171 repeats the step S121 until the image forming apparatus exits the power-saving mode. If it is determined in the step S122 that the image forming apparatus is not in the power-saving mode, the process proceeds to a step S123 wherein the CPU 171 determines whether or not the count value of the timer caused to start measuring time in the step S121 is equivalent to a predetermined period of time (e.g. two hours).

If it is determined in the step S123 that the count value of the timer is not greater than two hours, the process returns to the step S120. If it is determined in the step S123 that the count value of the timer is greater than two hours, the process proceeds to a step S124 wherein the CPU 171 carries out automatic adjustment, and the process then returns to the step S120. The automatic adjustment in the step S124 is for adjusting e.g. conditions for printing an image. In the automatic adjustment, various kinds of processes are carried out; in the present embodiment, the second toner density adjusting process described above with reference to FIG. 10 is carried out, for example.

In the above described process, only in the case where the image forming apparatus has been in the power-saving mode for a long period of time, the automatic adjustment is carried out for the following reasons. That is, in the case where the image forming apparatus does not perform printing for a long period of time, processing conditions of the image forming apparatus slightly vary, making it difficult to obtain a satisfactory image by the adjustment carried out previously. Also, in the case where the image forming apparatus has been in the power-saving mode for a short period of time, the automatic adjustment is not carried out, so that the image forming apparatus can return to the normal mode as quickly as possible to immediately start printing.

It should be noted that in the present embodiment, the automatic adjustment is selectively carried out or not according to the period of time for which the image forming apparatus has been in the power-saving mode, but the automatic adjustment may be necessarily carried out and the details of the automatic adjustment may be changed.

As described above, the period of time for which the image forming apparatus is in the power-saving mode is measured, and if the need arises according to the measurement result, the automatic adjustment is carried out, and if the need does not arise according to the measurement result, the image forming apparatus quickly returns to the normal mode without carrying out the automatic adjustment. In this way, the automatic adjustment is selectively carried out or not in the return process, and hence it is possible to operate the image forming apparatus in a stable condition and in an efficient manner.

A description will now be given of a third embodiment of the present invention. An image forming apparatus according to the third embodiment is identical in basic construction with the image forming apparatus according to the above described first embodiment. The third embodiment differs from the first embodiment only in the process executed when the image forming apparatus returns from the power-saving mode to the normal mode in the first embodiment described above with reference to FIG. 12. Therefore, only the process executed when the image forming apparatus returns from the power-saving mode to the normal mode will be described below with reference to FIG. 14 with descriptions referring to FIGS. 1 to 11 being omitted.

Figure 14:
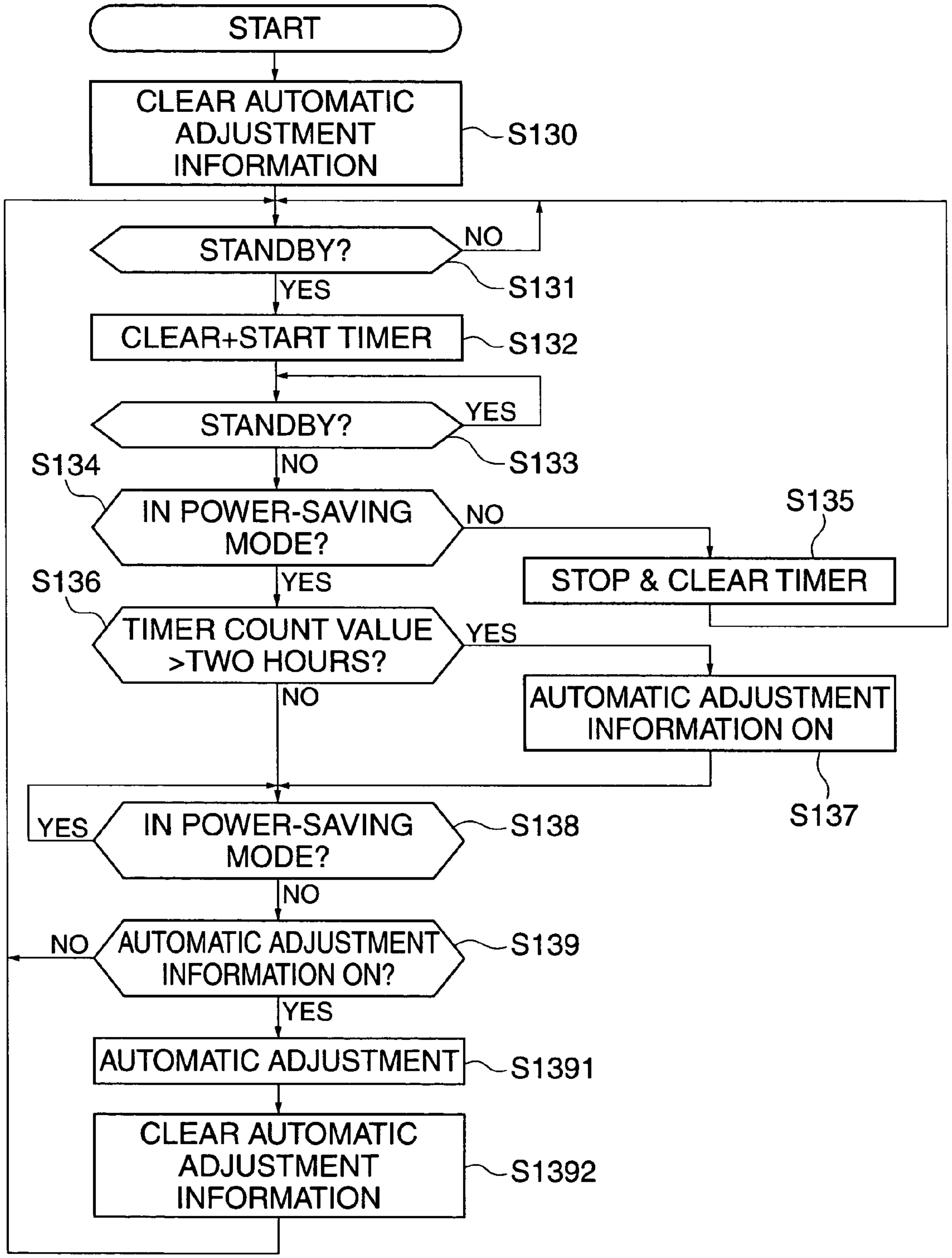
FIG. 14 is a flow chart showing a process executed when the image forming apparatus returns from a power-saving mode to a normal mode according to a third embodiment of the present invention.

FIG. 14 is a flow chart showing the process executed when the image forming apparatus returns from the power-saving mode to the normal mode. This process is started in response to turning-on of power supply for the image forming apparatus, and is executed by the CPU 171 in accordance with a control program stored in the ROM 174.

First, in a step S130, the CPU 171 clears automatic adjustment information, which will be referred to later. If this automatic adjustment information includes information indicative of "automatic adjustment ON", the automatic adjustment will be carried out later. After the execution of the step S130, the process proceeds to a step S131 wherein the CPU 171 determines whether the image forming apparatus is in a standby state or not. Although the term "standby state" is not described in detail since it is generally used for e.g. copying machines, the "standby state" means a state in which the image forming apparatus is ready to perform printing but is not currently performing printing. If it is determined in the step S131 that the image forming apparatus is not in the standby state, the CPU 171 repeats the step S131 until the image forming apparatus comes into the standby state. If it is determined in the step S131 that the image forming apparatus is in the standby state, the process proceeds to a step S132 wherein CPU 171 clears the timer and causes the timer to start measuring time.

After the execution of the step S132, the process proceeds to a step S133 wherein the CPU 171 determines whether the image forming apparatus is in the standby state or not. If it is determined in the step S133 that the image forming apparatus is in the standby state, the CPU 171 repeats the step S133 until the image forming apparatus comes out of the standby state. If it is determined in the step S133 that the image forming apparatus has come out of the standby state, the process proceeds to a step S134 wherein the CPU 171 determines whether the image forming apparatus is in the power-saving mode or not. If it is determined in the step S134 that the image forming apparatus is not in the power-saving mode, the process proceeds to a step S135 wherein the CPU 171 causes the timer to stop measuring time and at the same time clears the timer, and the process then returns to the step S131.

If it is determined in the step S133 that the image forming apparatus is not in the standby state and at the same time, it is determined in the step S134 that the image forming apparatus is not in the power-saving mode, it can be presumed, for example, that a job is being executed. If it is determined in the step S134 that the image forming apparatus is in the power-saving mode, the process proceeds to a step S136 wherein the CPU 171 determines whether the count value of the timer is equivalent to a predetermined period of time (e.g. two hours) or not. If it is determined in the step S136 that the count value of the timer is greater than two hours, the process proceeds to a step S137 wherein the CPU 171 stores the information indicative of "automatic adjustment ON" as the automatic adjustment information, and the process then proceeds to a step S138. If it is determined in the step S136 that the count value of the timer is equal to or smaller than two hours, the process proceeds to a step S138.

In the step S138, the CPU 171 determines whether the image forming apparatus is in the power-saving mode or not. If it is determined in the step S138 that the image forming apparatus is in the power-saving mode, the CPU 171 repeats the step S138 until the image forming apparatus comes out of the power-saving mode. If it is determined in the step S138 that the image forming apparatus has come out of the power-saving mode, the process proceeds to a step S139 wherein the CPU 171 determines whether the information indicative of "automatic adjustment ON" is stored as the automatic adjustment information or not.

If it is determined in the step S139 that the information indicative of "automatic adjustment ON" is not stored as the automatic adjustment information, the process returns to the step S131. If it is determined in the step S139 that the information indicative of "automatic adjustment ON" is stored as the automatic adjustment information, the process proceeds to a step S1391 wherein the CPU 171 carries out automatic adjustment. Upon completion of the automatic adjustment, the process proceeds to a step S1392 wherein the CPU 171 clears the automatic adjustment information, and the process then returns to the step S131. The automatic adjustment in the step S1391 is for adjusting e.g. conditions for printing an image. In the automatic adjustment, various kinds of processes are carried out; in the present embodiment, the second toner density adjusting process described above with reference to FIG. 10 is carried out, for example.

In the above described process, only in the case where the image forming apparatus was in the standby state for a long period of time before coming into the power-saving mode, the automatic adjustment is carried out for the following reasons. That is, in the case where the image forming apparatus has not performed printing for a long period of time, processing conditions of the image forming apparatus slightly vary, making it difficult to obtain a satisfactory image by the adjustment carried out previously. Although not described in the present embodiment, in the case where the image forming apparatus has been in the standby state for two hours and a half, the above described automatic adjustment is carried out. If whether the automatic adjustment is to be carried out or not is determined based on only the period of time for which the image forming apparatus has been in the standby state, the processing conditions vary with a higher possibility in the case where the image forming apparatus is had been in the standby state for two hours and has been in the power-saving mode for one hour than in the case where the image forming apparatus has been in the standby state for two hours and a half. For this reason, in the case where two hours has already elapsed before the image forming apparatus enters the power-saving mode, the automatic adjustment is carried out when the image forming apparatus exits the power-saving mode. Also, if the period of time for which the image forming apparatus has been in the standby state is short, the automatic adjustment is not carried out, so that the image forming apparatus returns to the normal mode as quickly as possible to immediately start printing.

It should be noted that in the present embodiment, the automatic adjustment is selectively carried out or not according to the period of time for which the image forming apparatus has been in the standby state, but the automatic adjustment may be necessarily carried out and the details of the automatic adjustment may be changed.

As described above, the period of time for which the image forming apparatus is in the standby state before the image forming apparatus enters the power-saving mode is measured, and if the need arises according to the measurement result, the automatic adjustment is carried out, and if the need does not arises according to the measurement result, the image forming apparatus quickly returns to the normal mode without carrying out the automatic adjustment. In this way, the automatic adjustment is selectively carried out or not in the return process, and hence it is possible to operate the image forming apparatus in a stable condition and in an efficient manner.

A description will now be given of a fourth embodiment of the present invention. An image forming apparatus according to the fourth embodiment is identical in basic construction with the image forming apparatus according to the above described first embodiment. The fourth embodiment differs from the first embodiment only in the process executed when the image forming apparatus returns from the power-saving mode to the normal mode in the first embodiment described above with reference to FIG. 12. Therefore, only the process executed when the image forming apparatus returns from the power-saving mode to the normal mode will be described with reference to FIG. 15 with descriptions referring to FIGS. 1 to 11 being omitted.

Figure 15:
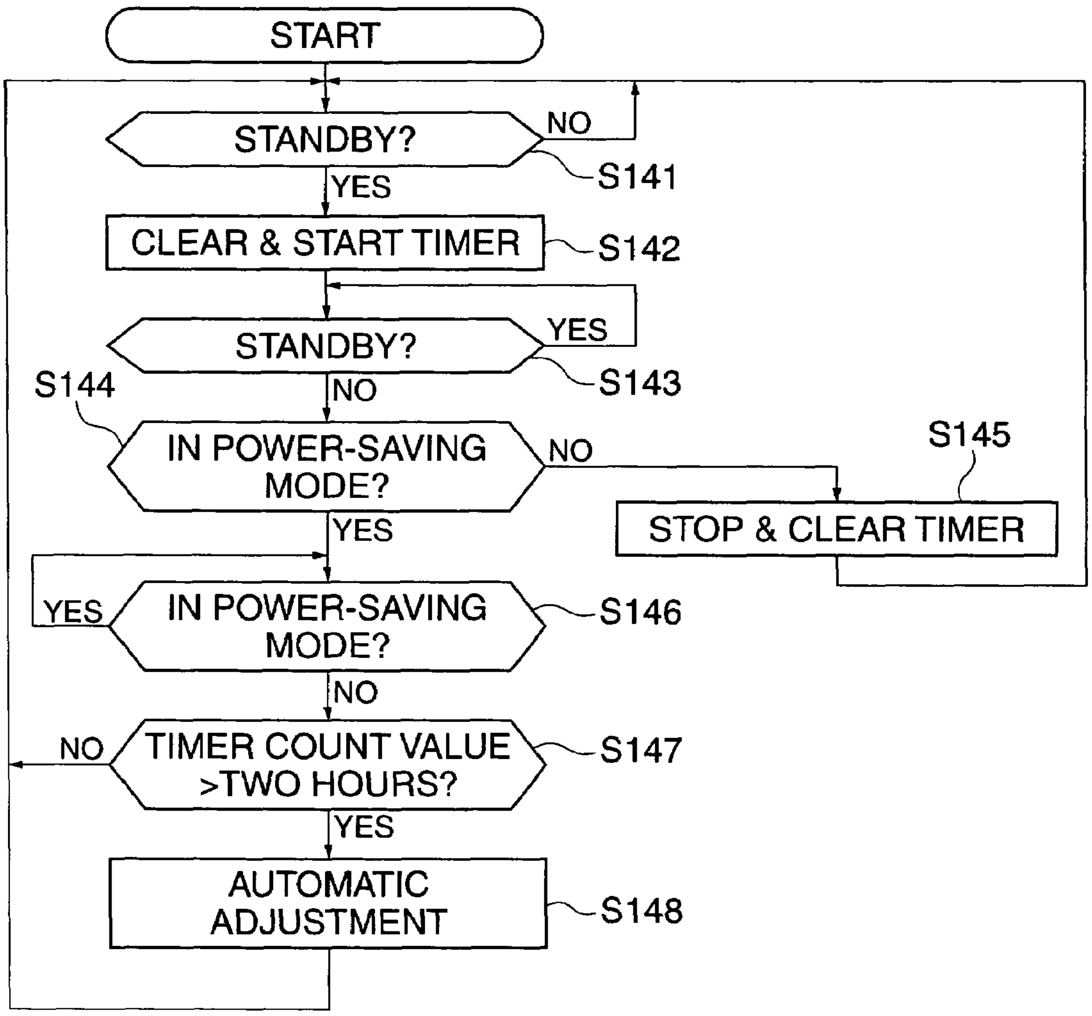
FIG. 15 is a flow chart showing a process executed when the image forming apparatus returns from a power-saving mode to a normal mode according to a fourth embodiment of the present invention.

FIG. 15 is a flow chart showing the process executed when the image forming apparatus returns from the power-saving mode to the normal mode. This process is started in response to turning-on of power supply for the image forming apparatus, and is executed by the CPU 171 in accordance with a control program stored in the ROM 174.

First, in a step S141, the CPU 171 determines whether the image forming apparatus is in the standby state or not. If it is determined in the step S141 that the image forming apparatus is not in the standby state, the CPU 171 repeats the step S141 until the image forming apparatus comes into the standby state. If it is determined in the step S141 that the image forming apparatus is in the standby state, the process proceeds to a step S142 wherein the CPU 171 clears the timer and causes the timer to start measuring time, and the process then proceeds to a step S143.

In the step S143, the CPU 171 determines whether the image forming apparatus is in the standby state or not. If it is determined in the step S143 that the image forming apparatus is in the standby state, the CPU 171 repeats the step S143 until the image forming apparatus comes out of the standby state. If it is determined in the step S143 that the image forming apparatus has come out of the standby state, the step proceeds to a step S144 wherein the CPU 171 determines whether the image forming apparatus is in the power-saving mode or not. If it is determined in the step S144 that the image forming apparatus is not in the power-saving mode, the process proceeds to a step S145 wherein the CPU 171 causes the timer to stop measuring time and at the same time clears the timer, and the process then returns to the step S141.

If it is determined in the step S143 that the image forming apparatus is not in the standby state and at the same time, it is determined in the step S144 that the image forming apparatus is not in the power-saving mode, it can be presumed that a job is being executed, for example. If it is determined in the step S144 that the image forming apparatus is in the power-saving mode, the process proceeds to a step S146 wherein the CPU 171 determines whether the image forming apparatus is in the power-saving mode or not. If it is determined in the step S146 that the image forming apparatus is in the power-saving mode, the CPU 171 repeats the step S146 until the image forming apparatus exits the power-saving mode.

If it is determined in the step S146 that the image forming apparatus has exit the power-saving mode, the process proceeds to a step S147 wherein the CPU 171 determines whether the count value of the timer is equivalent to a predetermined period of time (e.g. two hours) or not. If it is determined in the step S146 that the count value of the timer is equal to or smaller than two hours, the process returns to the step S141. If it is determined in the step S147 that the count value of the timer is greater than two hours, the process proceeds to a step S148 wherein the CPU 171 carries out automatic adjustment. The automatic adjustment in the step S148 is for adjusting e.g. conditions for printing an image. In the automatic adjustment, various kinds of processes are carried out; in the present embodiment, the second toner density adjusting process described above with reference to FIG. 10 is carried out, for example.

In the above described process, only in the case where the sum of a period of time for which the image forming apparatus had been in the standby state and a period of time for which the image forming apparatus has been in the power-saving mode is long, the automatic adjustment is carried out for the following reasons. That is, in the case where the image forming apparatus does not perform printing for a long period of time, processing conditions of the image forming apparatus slightly vary, making it difficult to obtain a satisfactory image by the adjustment carried out previously. Also, if the sum of a period of time for which the image forming apparatus had been in the standby state and a period of time for which the image forming apparatus has been in the power-saving mode is short, the automatic adjustment is not carried out, so that the image forming apparatus returns to the normal mode as quickly as possible to immediately start printing.

It should be noted that in the present embodiment, the automatic adjustment is selectively carried out or not according to the sum of a period of time for which the image forming apparatus had been in the standby state and a period of time for which the image forming apparatus has been in the power-saving mode, but the automatic adjustment may be necessarily carried out and the details of the automatic adjustment may be changed.

As described above, according to the present embodiment, the sum of a period of time for which the image forming apparatus had been in the standby state and a period of time for which the image forming apparatus has been in the power-saving mode is measured, and if the need arises according to the measurement result, the automatic adjustment is carried out, and if the need does not arise according to the measurement result, the image forming apparatus quickly returns to the normal mode without carrying out the automatic adjustment. In this way, the automatic adjustment is selectively carried out or not in the return process, and hence it is possible to operate the image forming apparatus in a stable condition and in an efficient manner.

Although in the above described embodiments, the image forming apparatus is implemented by a copying machine, the above described embodiments are, of course, not limitative to the present invention, but the present invention may be applied to a printer or to a multifunction machine.

Further, not only the toner density adjustment but also automatic registration in which misalignments between four color images are corrected may be carried out as the automatic adjustment.

Further, although in the above described embodiments, the image forming apparatus carries out image formation based on the electrophotographic process, the present invention is not limited to this, but the image forming apparatus may carry out image formation by another method such as electrostatic recording or ink-jet printing.

Further, it is to be understood that the object of the present invention may also be accomplished by supplying a system or an apparatus with a storage medium in which a program code of software which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and a storage medium on which the program code is stored constitute the present invention.

Examples of the storage medium for supplying the program code include a floppy (registered trademark) disk, a hard disk, an optical disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments thereof may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, it should be understood that the present invention is not limited to the embodiments described above, but various variations of the above described embodiments may be possible without departing from the spirits of the present invention.

What is claimed is:

1. An image forming apparatus comprising:

an image forming device that forms an image on a recording material;

a power-saving mode shifting device that shifts an operation mode of the image forming apparatus to a power-saving mode in which power consumption is saved;

a status detecting device that detects at least one of a status of the image forming apparatus before the operation mode is shifted to the power-saving mode by said power-saving mode shifting device and a status of the image forming apparatus in the power-saving mode; and a return process determining device that determines contents of a return process executed when the operation mode returns to a normal mode from the power-saving mode, according to a result of detection by said status detecting device.

2. An image forming apparatus according to claim 1, wherein said status detecting device detects a period of time for which said image forming device has not been used before the operation mode is shifted to the power-saving mode, and said return process determining process determines the contents of the return process according to the period of time for which said image forming device has not been used before the operation mode is shifted to the power-saving mode.

3. An image forming apparatus according to claim 1, wherein said status detecting device detects a sum of a period of time for which said image forming device has not been used before the operation mode is shifted to the power-saving mode and a period of time for which the image forming apparatus has been in the power-saving mode, and said return process determining device determines the contents of the return process according to the detected sum of the period of time for which said image forming device has not been used before the operation mode is shifted to the power-saving mode and the period of time for which the image forming apparatus has been in the power-saving mode.

4. An image forming apparatus according to claim 2, wherein the return process comprises at least adjustment relating to said image forming device, and said return process determining device omits execution of the adjustment relating to said image forming device as the return process when the period of time for which said image forming device has not been used before the operation mode is shifted to the power-saving mode is not greater than a predetermined period of time, and executes the adjustment relating to said image forming device as the return process when the period of time for which said image forming device has not been used before the operation mode is shifted to the power-saving mode is greater than the predetermined period of time.

5. An image forming apparatus according to claim 3, wherein the return process comprises at least adjustment relating to said image forming device, and said return process determining device omits execution of the adjustment relating to said image forming device as the return process when the sum of the period of time for which said image forming device has not been used before the operation mode is shifted to the power-saving mode and the period of time for which the image forming apparatus has been in the power-saving mode is not greater than a predetermined period of time, and executes the adjustment relating to said image forming device as the return process when the sum of the period of time for which said image forming device has not been used before the operation mode is shifted to the power-saving mode and the period of time for which the image forming apparatus has been in the power-saving mode is greater than the predetermined period of time.

6. An image forming apparatus according to claim 1, wherein said status detecting device detects whether a door of the image forming apparatus is opened or closed while the image forming apparatus is in the power-saving mode, and said return process determining device determines the contents of the return process according to a result of the detection as to whether the door is opened or closed.

7. An image forming apparatus according to claim 1, wherein said status detecting device detects a period of time for which the image forming apparatus has been in the power-saving mode, and said return process determining device determines the contents of the return process according to the detected period of time for which the image forming apparatus is in the power-saving mode.

8. An image forming apparatus according to claim 6, wherein the return process comprises at least adjustment relating to said image forming device, and said return process determining device executes the adjustment relating to said image forming device as the return process when the door is opened while the image forming apparatus is in the power-saving mode.

9. An image forming apparatus according to claim 7, wherein the return process comprises at least adjustment relating to said image forming device, and said return process determining device executes the adjustment relating to said image forming device as the return process when the period of time for which the image forming apparatus has been in the power-saving mode is greater than a predetermined period of time.

* * * * *